(12) United States Patent
Aizawa et al.

(10) Patent No.: US 9,988,006 B2
(45) Date of Patent: Jun. 5, 2018

(54) FRONT PART STRUCTURE OF VEHICLE

(71) Applicant: Mazda Motor Corporation, Aki-gun, Hiroshima (JP)

(72) Inventors: Makoto Aizawa, Hiroshima (JP); Yasuyuki Emi, Hiroshima (JP)

(73) Assignee: Mazda Motor Corporation, Aki-gun, Hiroshima (JP)

( * ) Notice: Subject to any disclaimer, the term of this patent is extended or adjusted under 35 U.S.C. 154(b) by 56 days.

(21) Appl. No.: 15/342,384

(22) Filed: Nov. 3, 2016

(65) Prior Publication Data
US 2017/0129430 A1    May 11, 2017

(30) Foreign Application Priority Data

Nov. 9, 2015 (JP) .................................. 2015-219790
Nov. 9, 2015 (JP) .................................. 2015-219836

(51) Int. Cl.
*B60R 19/34* (2006.01)
*B60R 19/18* (2006.01)
*B60R 21/34* (2011.01)
*B60R 19/52* (2006.01)
*B62D 25/08* (2006.01)

(52) U.S. Cl.
CPC .............. *B60R 19/18* (2013.01); *B60R 19/52* (2013.01); *B60R 21/34* (2013.01); *B60R 2019/1886* (2013.01); *B60R 2019/527* (2013.01); *B60R 2021/343* (2013.01); *B62D 25/085* (2013.01)

(58) Field of Classification Search
CPC ......... B60R 19/18; B60R 19/52; B60R 21/34; B60R 2019/1886; B60R 2019/527; B60R 2021/343; B60R 25/085
See application file for complete search history.

(56) References Cited

U.S. PATENT DOCUMENTS 3,926,462 A * 12/1975 Burns ..................... B60R 19/18
293/1
2010/0244484 A1* 9/2010 Nakaura ................. B60R 21/38
296/187.04
2014/0291056 A1* 10/2014 Takanaga ............. B60K 11/085
180/274

FOREIGN PATENT DOCUMENTS

JP          2003261067 A      9/2003

* cited by examiner

*Primary Examiner* — Lori L Lyjak
(74) *Attorney, Agent, or Firm* — Alleman Hall Creasman & Tuttle LLP

(57) ABSTRACT

A front part structure of a vehicle is provided, that includes a bumper fascia disposed at a front part of the vehicle and having an upper end portion opposing a leading edge of a hood, a shroud disposed rearward from the bumper fascia, and configured to lead cooling air to a given device, a coupling member provided with a first portion coupled to the shroud and a second portion that is a portion located forward of the first portion and below the upper end portion of the bumper fascia, and an impact absorbing member provided with a support part that supports the upper end portion and intervenes between the upper end portion of the bumper fascia and the second portion of the coupling member, and a fixed part that is disposed below the support part and is fixed to the second portion.

19 Claims, 21 Drawing Sheets

FRONT PART STRUCTURE OF VEHICLE

BACKGROUND

The present invention relates to a front part structure of a vehicle, provided with a bumper fascia and a shroud in a front part of the vehicle.

Generally, vehicles, such as automobiles, are provided with a bumper fascia in a front part of the vehicle. An upper end portion (rear portion) of the bumper fascia forms a parting line between a front edge portion of an engine hood and the bumper fascia. Here, the upper end portion of the bumper fascia may be lowered by its own weight and/or weights of other components so that a gap of the parting line spreads, resulting in a problem of deteriorating an appearance quality. In view of this problem, JP2003-261067A discloses a front part structure of a vehicle, where an upper end portion of a bumper fascia is supported by a highly-rigid member.

Moreover, it is known that, considering a pedestrian's head may be struck against a hood when a vehicle collides to a pedestrian at a front end, a mechanism capable of absorbing the impact in a substantially vertical direction for a head protection is incorporated into the vehicle front part. This absorber mechanism is incorporated into a part of the vehicle, which is located considerably rear of the bumper fascia in automobiles having a common vehicle height at the front part.

On the other hand, for vehicles having a high vehicle front part, the area which is used for absorbing the head collision impact is located forward with respect to the vehicle having the common vehicle height. In such a case, the upper end portion of the bumper fascia is included in the area which is used for the absorption. However, if the upper end portion of the bumper fascia is supported by the highly-rigid member in order to solve the problem of the bumper fascia suspension, like the front part structure disclosed in JP2003-261067A, a sufficient absorption effect cannot be expected.

SUMMARY

The present invention is made in view of the above problems, and aims to provide a front part structure of a vehicle that is provided with an absorber mechanism for a head protection of a pedestrian, and prevents a bumper fascia from being lowered.

According to one aspect of the present invention, a front part structure of a vehicle is provided. The front part structure includes a bumper fascia disposed at a front part of the vehicle and having an upper end portion opposing a leading edge of a hood, a shroud disposed rearward from the bumper fascia, and configured to lead cooling air to a given device, a coupling member provided with a first portion coupled to the shroud and a second portion located forward of the first portion and below the upper end portion of the bumper fascia, and an impact absorbing member provided with a support part and a fixed part. The support part intervenes between the upper end portion of the bumper fascia and the second portion of the coupling member, and supports the upper end portion. The fixed part is disposed below the support part and is fixed to the second portion.

With the above configuration, the upper end portion of the bumper fascia is supported by the shroud through the coupling member and the impact absorbing member. Therefore, the drooping of the bumper fascia can be prevented. Further, the upper end portion of the bumper fascia is supported by the impact absorbing member. Therefore, even if a vertical impact is applied to the upper end portion, the impact can be buffered by the impact absorbing member.

The impact absorbing member may be provided with an upper plate, a front plate, and a lower plate, and have a 'C' shape that is opened rearward, when viewed in a cross sectional perspective thereof in longitudinal directions of the vehicle. The support part may be provided to the upper plate, and the fixed part may be provided to one of the front plate and the lower plate.

With this configuration, the impact absorbing member is comprised of a structure in which no standing wall is provided rearward thereof, the upper plate supports the upper end portion of the bumper fascia, and the impact absorbing member is fixed at the one of the front plate and the lower plate to the second portion of the coupling member. Therefore, the impact absorbing member has an easy-to-deform characteristic. In addition, the impact absorbing member can easily absorb a vertical impact.

In the front part structure described above, the impact absorbing member may be disposed so that the front plate is located adjacent to and rearward of a parting line that is formed between the upper end portion of the bumper fascia and the leading edge of the hood.

With this configuration, the front plate to which a supporting load is mainly applied in the impact absorbing member is located adjacent to and behind the parting line. Therefore, not only is the drooping of the bumper fascia by its own weight prevented, but also a drooping of the hood by its own weight can be suitably prevented.

The second portion of the coupling member may be provided with a flange plate extending upwardly. The front plate of the impact absorbing member may be provided with a lower part that is disposed so as to overlap with the flange plate in longitudinal directions of the vehicle, and forms the fixed part, and an upper part that does not overlap with the flange plate in longitudinal directions of the vehicle.

With this configuration, the upper part of the front plate of the impact absorbing member (i.e., a part having a vertical dimension corresponding thereto) can be used as a part for elastic deformation when the load is applied to the bumper fascia. Therefore, the impact absorbing member can suitably absorb the impact. Moreover, since the front plate overlaps with the flange plate in longitudinal directions of the vehicle, an inserting direction of a fixing screw etc. which fixes them is also oriented parallel to longitudinal directions of the vehicle. Therefore, a tip end of the screw may be structured so as not to point upward from which a head of a pedestrian may be struck against the upper end portion of the bumper fascia.

In the front part structure described above, the bumper fascia may have an opposing plate that opposes the flange plate of the coupling member. The flange plate may have a mounted part to the opposing plate. The mounted part may be disposed above a location where the first portion of the coupling member is coupled to the shroud.

With this configuration, since the coupling member is further provided with the portion which is directly mounted to the bumper fascia, the supporting state of the bumper fascia is stabilized. Moreover, the mounted part of the flange plate at the second portion is disposed above the location where the first portion of the coupling member is coupled to the shroud. Thus, a moment caused by the load applied downwardly to the second portion can be formed, which is supportable by high rigidity.

In the front part structure described above, the impact absorbing member may be provided with a reinforcement rib that couples the front plate and the upper plate. The lower end of the reinforcement rib may be disposed so as to be separated from the lower plate by a given distance.

With this configuration, the supporting rigidity of the bumper fascia by the impact absorbing member can be increased without significantly lowering an impact absorbing capability of the impact absorbing member.

The front part structure described above may further include a covering member for covering a portion of the impact absorbing member that is opened rearward.

With this configuration, even if the impact absorbing member has the 'C' shape that is opened rearward, an entry of water and dust from the open part can be prevented. Therefore, durability of the impact absorbing member can be increased.

According to another aspect of the present invention, the coupling member couples the shroud to the upper end portion of the bumper fascia. The impact absorbing member intervenes between the upper end portion of the bumper fascia and the coupling member. The coupling member includes a rear portion having a planar part extending in width directions of the vehicle and a coupled part coupled to the shroud, and a front portion having a recessed portion that is located below the upper end portion of the bumper fascia, is dented lower than the planar part, and extends in width directions of the vehicle. The impact absorbing member is provided with the support part that is disposed on the recessed portion and supports the upper end portion of the bumper fascia, and the fixed part that is fixed to the coupling member.

With the above configuration, the upper end portion of the bumper fascia is supported by the shroud through an integrated body of the coupling member and the impact absorbing member. Therefore, the drooping of the bumper fascia can be prevented. Further, the upper end portion of the bumper fascia is supported by the impact absorbing member. Therefore, even if a vertical impact is applied to the upper end portion, the impact can be buffered by the impact absorbing member. Furthermore, since the recessed portion is formed in the front portion of the coupling member, the rigidity of the coupling member in width directions of the vehicle can be increased. Moreover, a vertical distance between the coupling member and the upper end portion of the bumper fascia becomes longer by the downwardly-dented amount of the recessed portion. Since the impact absorbing member is placed on the recessed portion, a vertical dimension of the impact absorbing member can become larger, and when a load is applied to the bumper fascia, it becomes possible to have sufficient buffer for elastic deformation.

The fixed part of the impact absorbing member to the coupling member may be disposed above the planar part.

With this configuration, since the fixed part is disposed above the planar part, a moment caused by the load applied downwardly to the coupling member can be formed, which is supportable by high rigidity.

The front portion of the coupling member may be provided with a flange plate extending upwardly. The impact absorbing member may be provided with a front plate that opposes the flange plate. The front plate may be provided with a lower part that is disposed so as to overlap with the flange plate in longitudinal directions of the vehicle, and forms the fixed part, and an upper part that does not overlap with the flange plate in longitudinal directions of the vehicle.

With this configuration, the upper part of the front plate of the impact absorbing member (i.e., a part having a vertical dimension corresponding thereto) can be used as a part for elastic deformation when the load is applied to the bumper fascia. Therefore, the impact absorbing member can suitably absorb the impact. Moreover, since the front plate overlaps with the flange plate in longitudinal directions of the vehicle, an inserting direction of a fixing screw etc. which fixes them is also oriented parallel to longitudinal directions of the vehicle. Therefore, a tip end of the screw may be structured so as not to point upward from which a head of a pedestrian may be struck against the upper end portion of the bumper fascia.

The bumper fascia may have an opposing plate that opposes the flange plate of the coupling member. The flange plate may have a mounted part that opposes the opposing plate. The mounted part may be disposed at substantially a same height as the fixed part of the impact absorbing member.

With this configuration, since the coupling member is further provided with the portion which is directly mounted to the bumper fascia, the supporting state of the bumper fascia is stabilized. Moreover, since the mounted part is disposed at substantially the same height as the fixed part, the above described stroke does not become small.

The impact absorbing member may be provided with an upper plate, a front plate, and a lower plate, and may have a 'C' shape that is opened rearward, when viewed in a cross sectional perspective thereof in longitudinal directions of the vehicle. The support part may be provided to the upper plate, and the fixed part may be provided to one of the front plate and the lower plate.

With this configuration, the impact absorbing member is comprised of a structure in which no standing wall is provided rearward thereof, the upper plate supports the upper end portion of the bumper fascia, and the impact absorbing member is fixed at the one of the front plate and the lower plate to the second portion of the coupling member. Therefore, the impact absorbing member has an easy-to-deform characteristic. In addition, the impact absorbing member can easily absorb a vertical impact.

The recessed portion may be provided with a first recessed portion where the impact absorbing member is placed, and a second recessed portion formed rearward of and integrally with the first recessed portion, and dented lower than the first recessed portion.

With this configuration, since the second recessed portion is dented deeper than the first recessed portion where the impact absorbing member is placed, the rigidity of the coupling member in width directions of the vehicle can be increased.

The second recessed portion may function as a drainage channel of water that enters from a gap between the upper end portion of the bumper fascia and the leading edge of the hood.

With this configuration, when rain water enters into the recessed portion of the coupling member, the water will flow into the deeper second recessed portion. In this regard, since the second recessed portion functions as the drainage channel of water, it can prevent water from accumulating in the recessed portion.

DETAILED DESCRIPTION OF EMBODIMENTS

[Outline of Vehicle Front Part]

Figure 1:
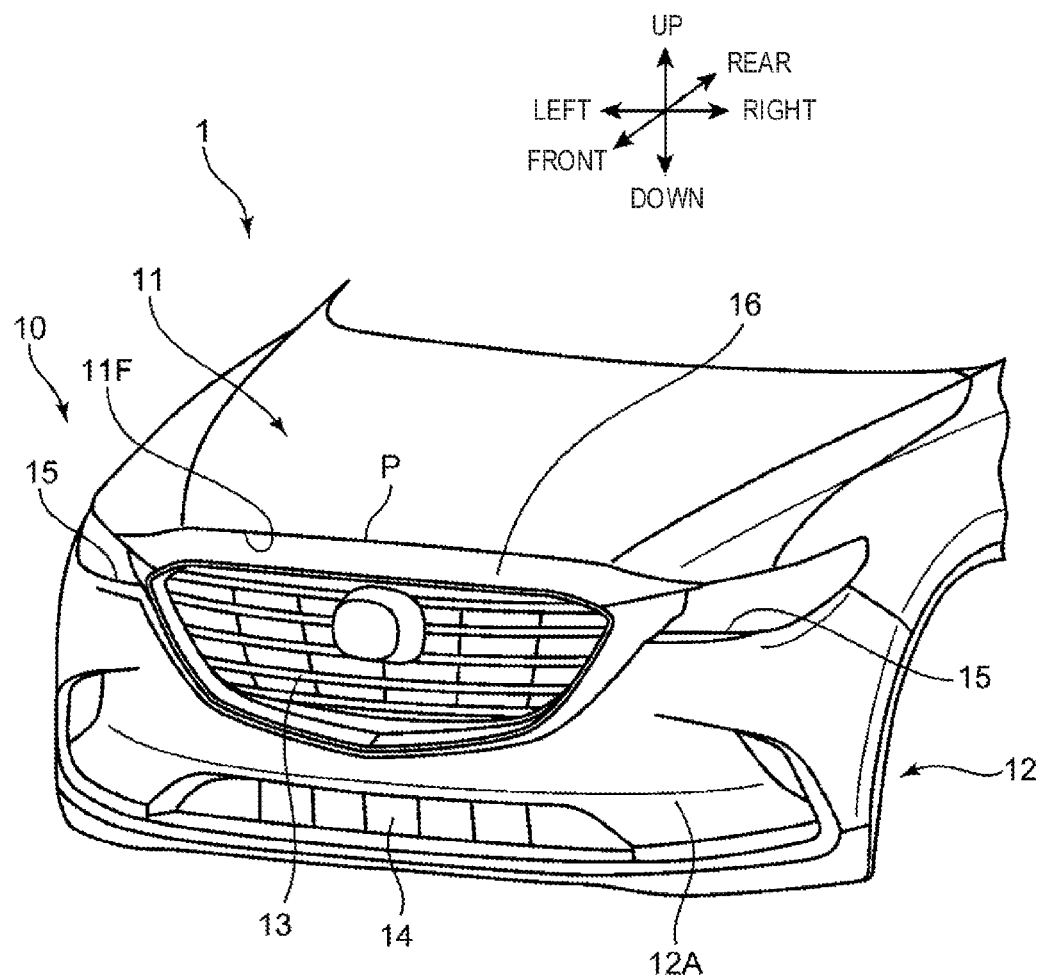
FIG. 1 is a perspective view illustrating one example of a front part of a vehicle to which the present invention is applied.
Figure 2:
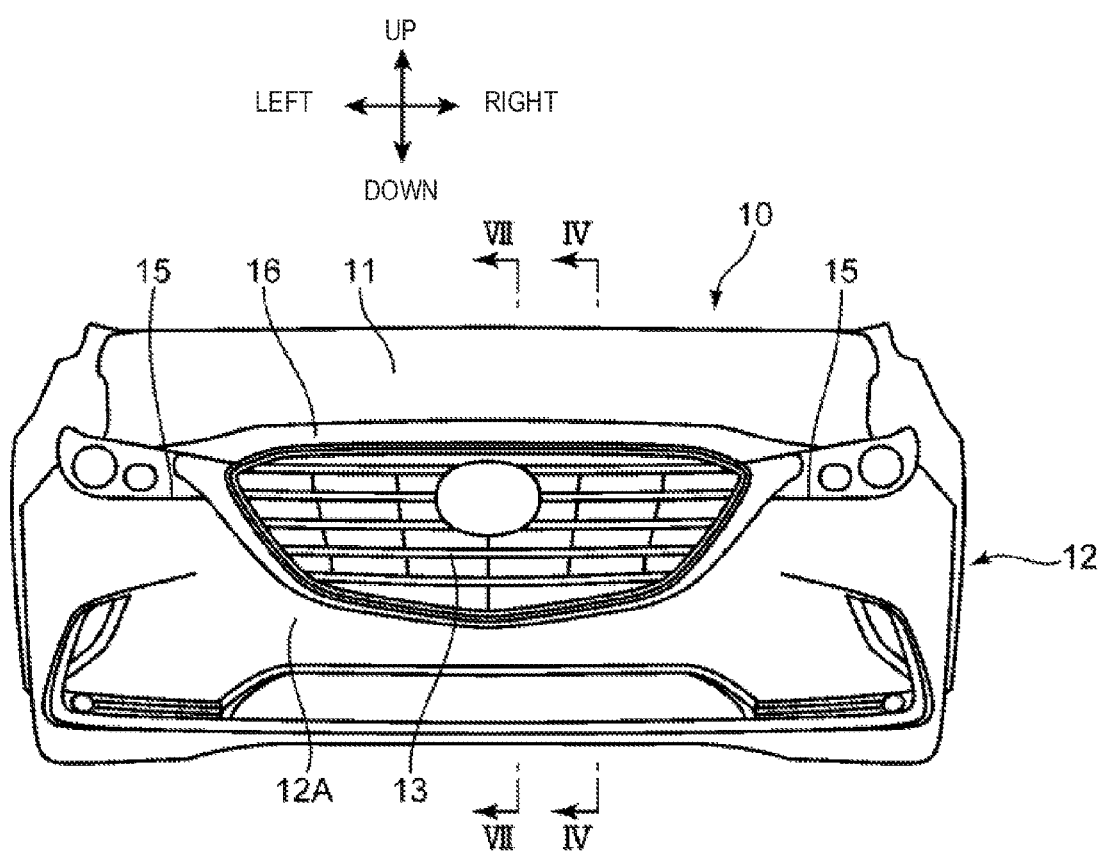
FIG. 2 is a front elevational view illustrating the front part of the vehicle.

Hereinafter, several embodiments of the present invention are described with reference to the accompanying drawings. FIG. 1 is a perspective view illustrating a front part 10 of a vehicle 1, such as an automobile, to which the present invention is applied. Note that, throughout the drawings, front (forward) and rear (rearward) in longitudinal directions of the vehicle 1 are indicated by arrows with indications of "front" and "rear," left (leftward) and right (rightward) in width or lateral directions of the vehicle 1 are indicated by arrows with indications of "left" and "right," and up (upward) and down (downward) in vertical directions of the vehicle 1 are indicated by arrows with indications of "up" and "down," respectively. FIG. 2 is a front elevational view of the front part 10 of the vehicle, and FIG. 3 is a perspective view illustrating a structure of the front part 10 of the vehicle according to the embodiment of the present invention.

The front part 10 of the vehicle 1 is provided with an engine hood 11 and a bumper fascia 12, as an exterior structure of the vehicle 1. The bumper fascia 12 includes a fascia main part 12A which covers a front end portion of the vehicle 1, a front grille 13 disposed in an upper part of the fascia main part 12A at the center in width directions of the vehicle, and a bumper grille 14 disposed below the front grille 13. Headlight openings 15 are formed at both lateral ends of the front grille 13. Moreover, a fascia upper end plate 16 (an upper end portion of the bumper fascia) used as a portion opposing a leading edge 11F of the hood 11 is mounted to an upper surface of the front grille 13.

Figure 3:
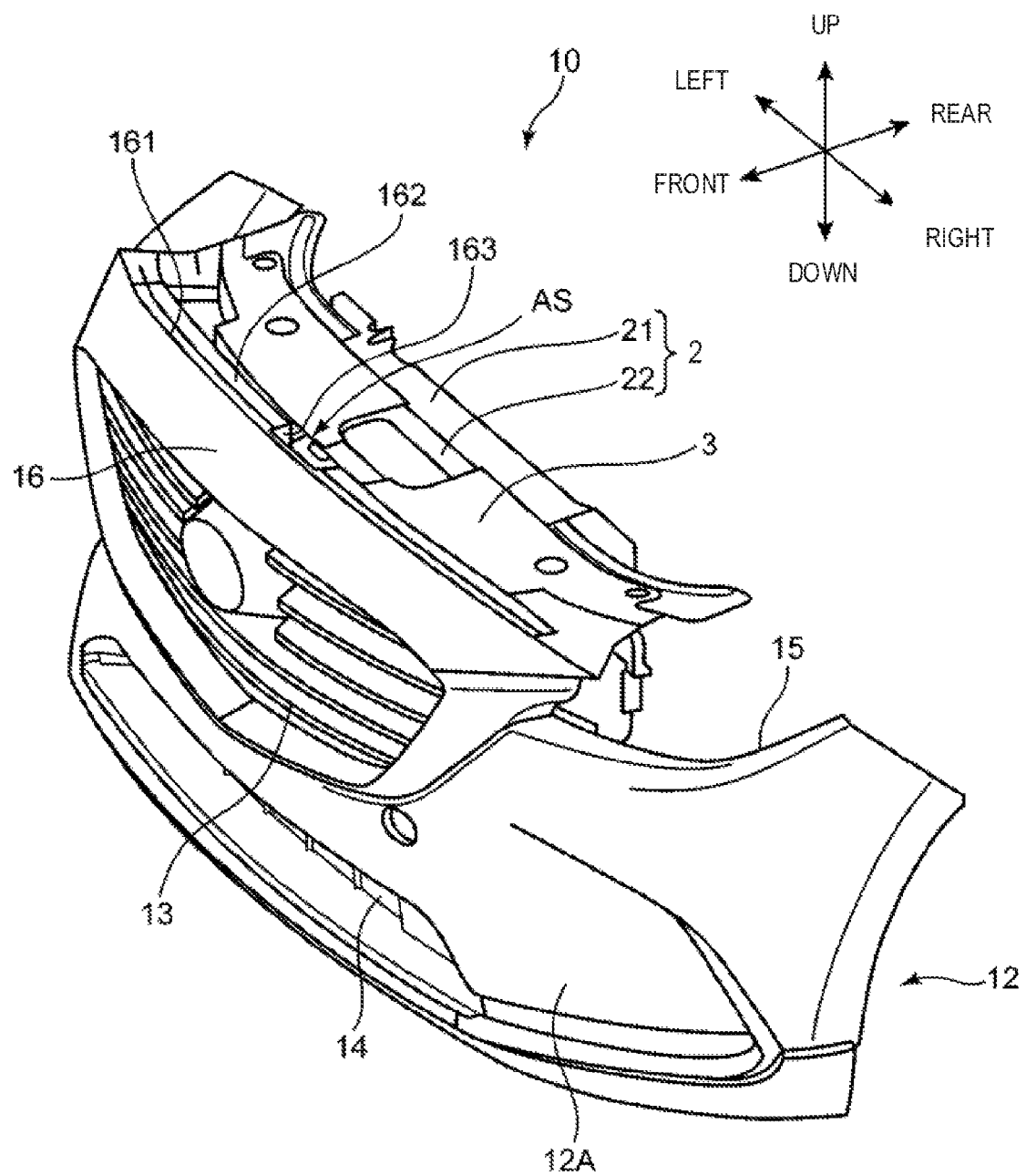
FIG. 3 is a perspective view illustrating the front part structure of the vehicle according to one embodiment of the present invention.

With reference to FIG. 3, the fascia upper end plate 16 is a plate member which is elongated in width directions of the vehicle, and inclines downwardly as it extends forward like an extended part of the inclination of the hood 11. A rear end of the fascia upper end plate 16 is comprised of an upper edge 161 which opposes the leading edge 11F of the hood 11, and an upper bracket 162 which extends rearward from the upper edge 161. The upper edge 161 and the leading edge 11F oppose each other through a gap, and as illustrated in FIG. 1, a parting line P (the gap) extending in width directions of the vehicle is formed therebetween. The upper bracket 162 is located at a height below the upper edge 161, and extends substantially horizontally. A notch 163 having a rectangular shape extending in width directions of the vehicle is formed at the center of the upper bracket 162 in width directions of the vehicle. The notch 163 is an opening which forms an accessible space AS through which a user inserts his/her fingers when the user lifts and opens the hood 11.

A shroud 2 is disposed rearward of the bumper fascia 12. The shroud 2 is a frame structure with high rigidity for holding a radiator (a given device) which is not illustrated, and leading cooling air which is introduced via the front grille 13 to the radiator. The shroud 2 is comprised of a shroud panel 21 which forms a rectangular frame, and a shroud upper member 22 mounted to an upper surface of the shroud panel 21.

In this embodiment, a grille bracket 3 (a coupling member) is bridged between the bumper fascia 12 and the shroud 2 so that the bumper fascia 12 is supported by the shroud 2. Specifically, the shroud upper member 22 is coupled to the fascia upper end plate 16 by the grille bracket 3. This is for preventing the bumper fascia 12 from being lowered by its own weight—in other words, for preventing quality deterioration in appearance which is caused by the fascia upper end plate 16 descending and the gap at the parting line P spreading.

The grille bracket 3 is comprised of a member with high rigidity, such as a plastic member reinforced by glass fibers, or a sheet metal. If such a high-rigidity support structure in which the fascia upper end plate 16 is supported by the grille bracket 3 is adopted, an impact absorbing function cannot be provided to the structure. In that case, if the height of the front part 10 is high like the vehicle 1 of this embodiment, it is not a desirable state in terms of head protection for a pedestrian. In this embodiment, in consideration of this problem, a front part structure of the vehicle 1 is provided where both a function for preventing the bumper fascia 12 from being lowered and an impact absorbing function for the head protection of a pedestrian are achieved.

[Cross-Sectional Structure of Vehicle Front Part]

Figure 4:
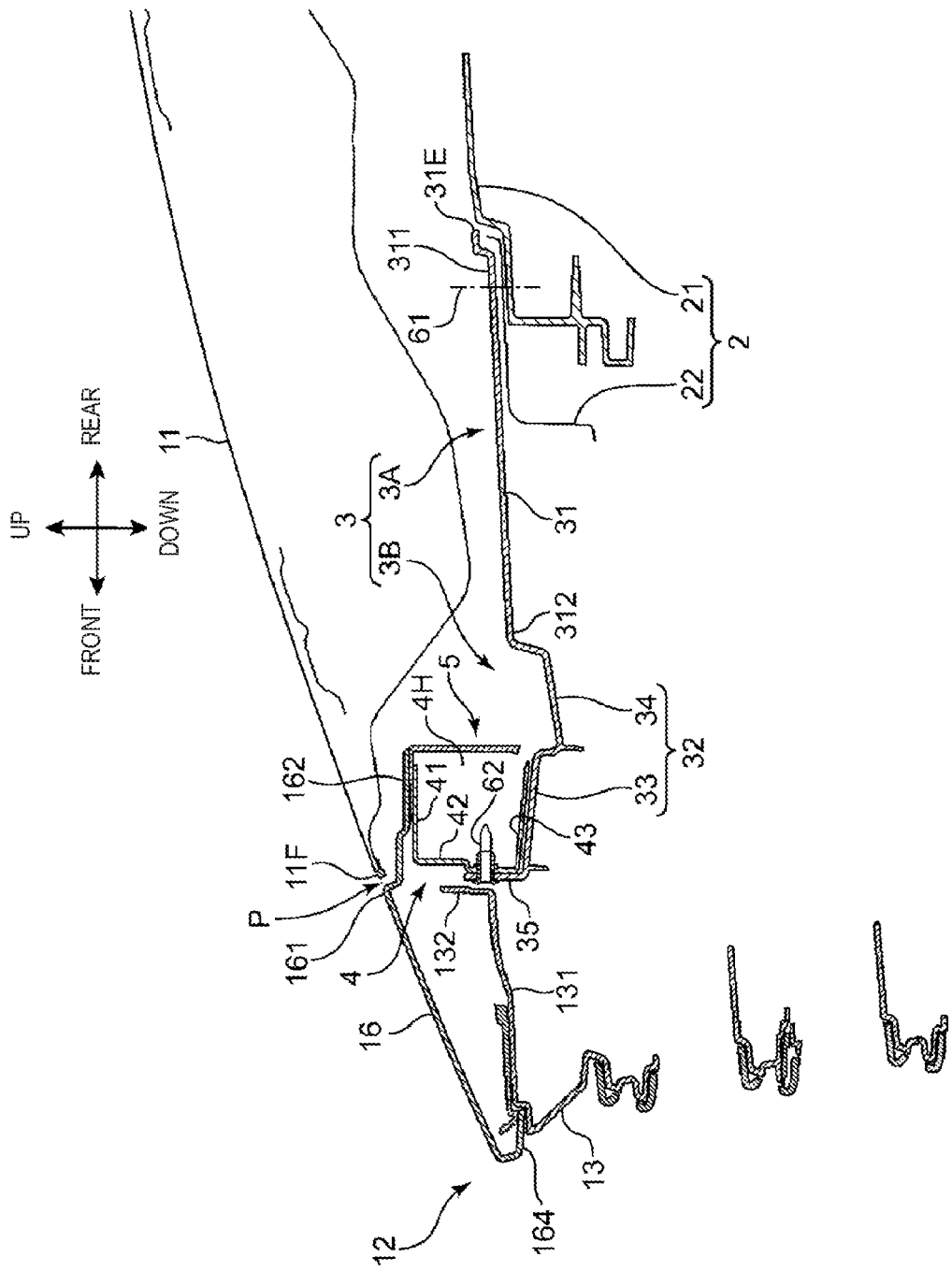
FIG. 4 is a schematic cross-sectional view taken along a line IV-IV in FIG. 2.
Figure 5:
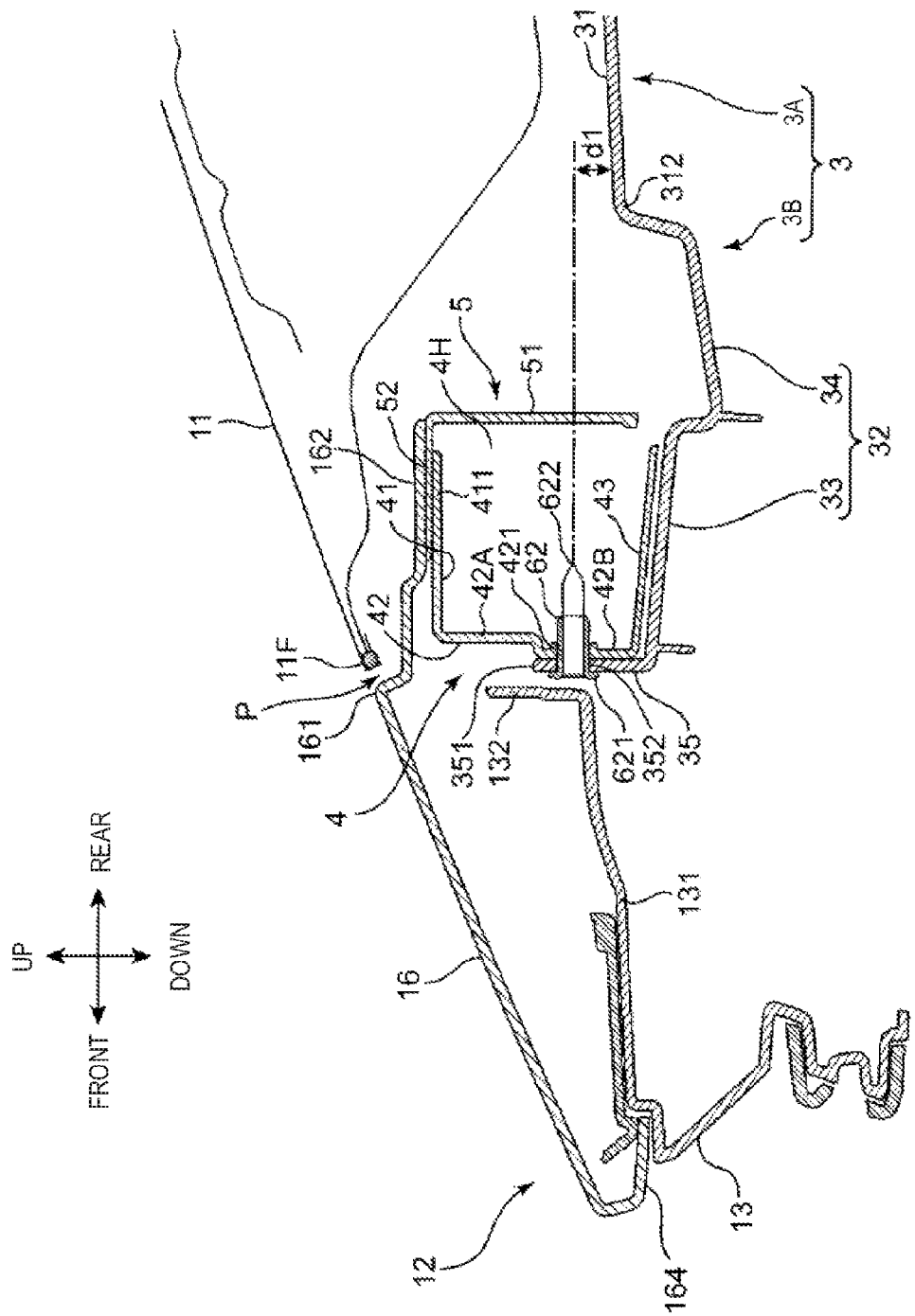
FIG. 5 is a magnified cross-sectional view taken along the line IV-IV in FIG. 2.
Figure 6:
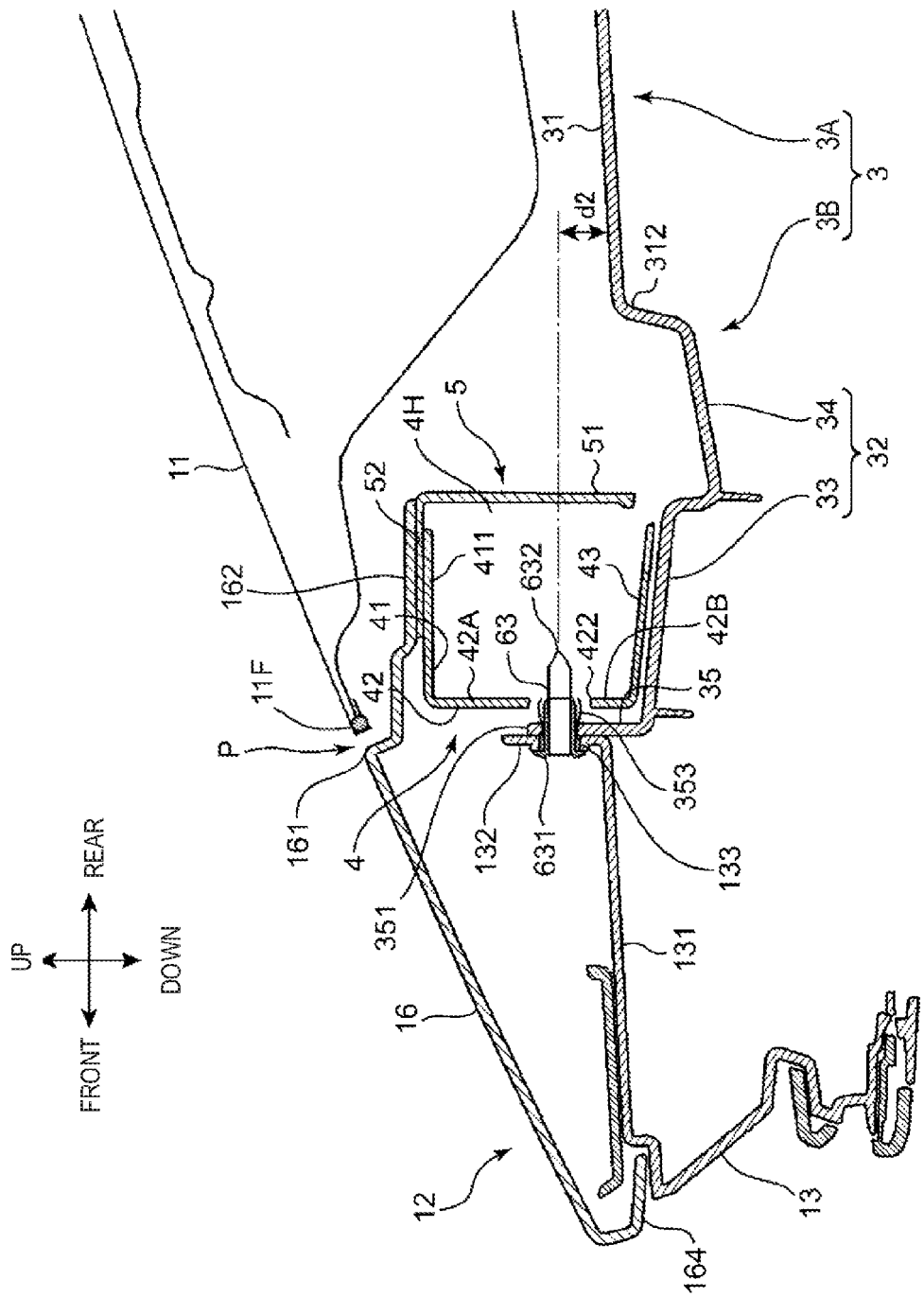
FIG. 6 is a schematic cross-sectional view illustrating a location which is shifted by a given distance from the cross section of FIG. 4 in a vehicle width direction.
Figure 7:
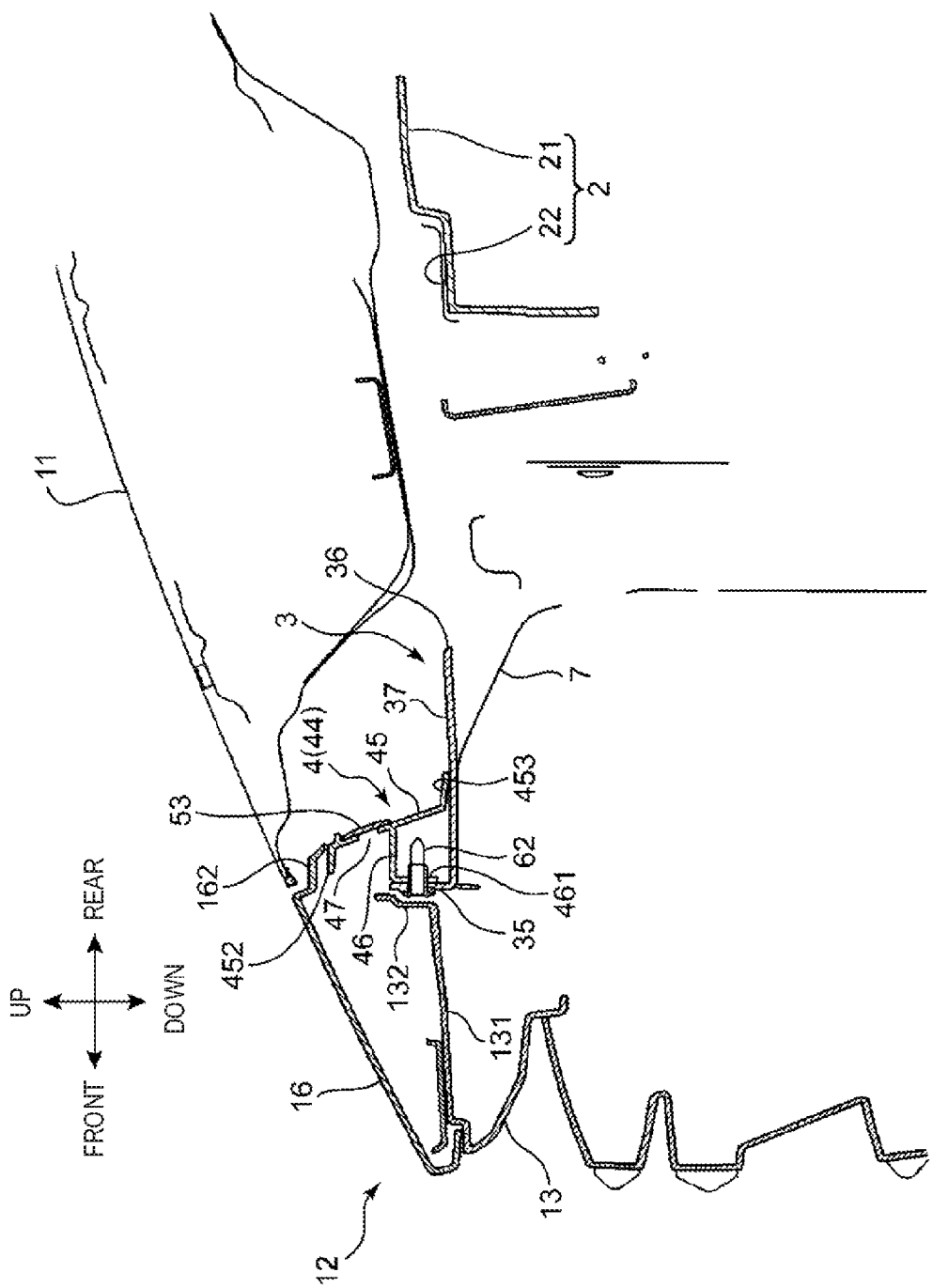
FIG. 7 is a schematic cross-sectional view taken along a line VII-VII in FIG. 2.

FIG. 4 is a schematic cross-sectional view taken along a line IV-IV in FIG. 2; FIG. 5 is a magnified cross-sectional view taken along the line IV-IV in FIG. 2; FIG. 6 is a schematic cross-sectional view illustrating a location which is shifted by a given distance from the cross section of FIG. 4 in the width direction of the vehicle; and FIG. 7 is a schematic cross-sectional view taken along a line VII-VII in FIG. 2. FIGS. 4 to 6 illustrate cross sections of a portion which is located away from the central portion to the right in the width direction of the vehicle, i.e., a portion which is laterally shifted from the portion where the accessible space AS exists. FIG. 7 illustrates a cross section of the central portion where the accessible space AS exists. The grille bracket 3, an impact absorbing member 4, and a covering member 5 are disposed in each one of spaces covered by the hood 11 and the bumper fascia 12, of the front part 10 of the vehicle 1.

<Cross-Sectional Structure of Laterally-Shifted Portion from Accessible Space>

Figure 13:
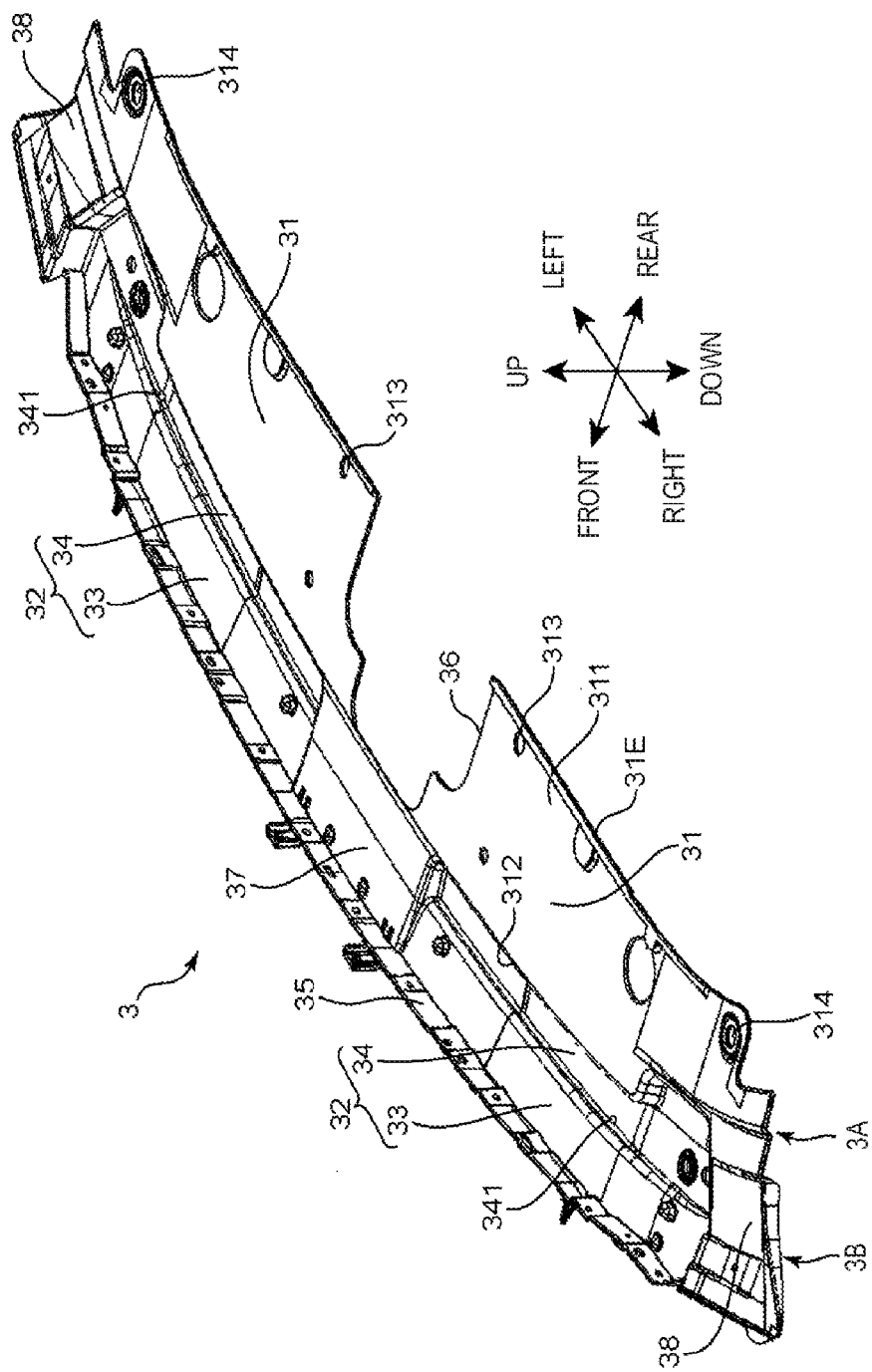
FIG. 13 is a perspective view of the grille bracket alone.

First, with reference to FIGS. 4 and 5, a cross-sectional structure of the laterally-shifted portion from the accessible space AS is described. The grille bracket 3 is comprised of a rear portion 3A including a portion coupled to the shroud 2, and a front portion 3B which is a portion forward of the rear portion 3A and includes a portion located below the fascia upper end plate 16. FIG. 13 illustrates a perspective view of the grille bracket 3 alone.

The rear portion 3A includes planar parts 31 extending in the lateral directions which are the width direction of the vehicle, rear end parts 311 (first portions) coupled to the shroud 2, and bent parts 312 which are boundary portions with the front portion 3B. The rear end parts 311 are placed on the upper surface of the shroud upper member 22 in an overlapped manner. Trailing edges 31E of the rear end parts 311 and a trailing edge of the shroud upper member 22 are located at substantially the same location in longitudinal directions of the vehicle. Threaded holes 313 (FIG. 13) are formed in the rear end parts 311, and threaded holes corresponding to the threaded holes 313 are formed in the shroud upper member 22. First fixing screws 61 are threadedly engaged with the threaded holes 313 so that the rear end parts 311 are fixedly coupled to the shroud upper member 22. The bent parts 312 are portions which are formed by bending front ends of the planar parts 31 downwardly.

The front portion 3B is comprised of recessed portions 32 which are dented downwardly to a height below the planar parts 31 and extend in width directions of the vehicle, and flange plates 35 extending upwardly therefrom, respectively. Rear end walls of the recessed portions 32 are standing walls which continue to the bent parts 312, and front end walls of the recessed portions 32 form the flange plates 35. Since such recessed portions 32 are formed in the front portion 3B, the rigidity of the grille bracket 3 in the width direction of the vehicle is increased. Each recessed portion 32 is comprised of a first recessed portions 33 (second portion) located forward, and a second recessed portion 34 which continues to the first recessed portions 33 and is dented lower than the first recessed portions 33. That is, a bottom plate of the second recessed portion 34 exists at a position below the bottom plates of the first recessed portions 33. Thus, since the two recessed portions 33 and 34 which have different dented heights are formed in each recessed portion 32, the rigidity of the grille bracket 3 in width directions of the vehicle is further increased. Moreover, the vertical distance between the grille bracket 3 and the fascia upper end plate 16 is increased when the recessed portions 32 are dented further downward.

For example, in FIG. 5, if the planar parts 31 extend to the front portion 3B, the distance between the grille bracket 3 and the fascia upper end plate 16 becomes shorter by an amount of the absence of the dents of the first recessed portions 33. In that case, the space where the impact absorbing member 4 is placed also becomes smaller, and the vertical dimension of the impact absorbing member 4 also becomes shorter. Therefore, when an impact load is applied to the fascia upper end plate 16, the elastic deformation stroke of the impact absorbing member 4 cannot fully be used. On the other hand, in this embodiment, since the impact absorbing member 4 is placed on the recessed portions 32 (first recessed portions 33), the vertical dimension of the impact absorbing member 4 becomes larger and, thus, the stroke described above can fully be used.

The first recessed portion 33 is located below the upper bracket 162 of the fascia upper end plate 16, and is a portion onto which the impact absorbing member 4 is placed. The second recessed portion 34 functions, in addition to the function described above which increases the rigidity, as a drainage channel of water which enters into a gap between the fascia upper end plate 16 and the leading edge 11F of the hood 11 (i.e., the parting line P). Therefore, a drain hole 341 (see FIG. 13) is formed in the bottom plate of the second recessed portion 34. The bottom plate inclines forward and downward as illustrated in FIGS. 4 and 5, and the drain hole 341 is located in the lowest portion of the bottom plate. When rain water etc. enters into the recessed portions 32 through the parting line P, the water will flow into the deeper second recessed portions 34. Since the water will be discharged outside through the drain holes 341, the water will not be accumulated in the recessed portions 32.

The flange plates 35 are portions which rise from the leading edge of the front portion 3B vertically upward. The rising or standup height of the flange plates 35 is about a half of the height of the impact absorbing member 4, which will be described later. First fastening holes 352, into which second fixing screws 62 which couple the impact absorbing member 4 to the grille bracket 3 are inserted, are formed at locations near upper edges 351 of the flange plates 35. Note that the flange plates 35 do not necessarily rise from the leading edge of the front portion 3B, but may rise from a location rearward from the leading edge.

The impact absorbing member 4 is a member which intervenes between the fascia upper end plate 16 and the grille bracket 3. In more detail, the impact absorbing member 4 intervenes between the upper bracket 162 of the fascia upper end plate 16 and the first recessed portions 33 of the recessed portions 32. The primary functions of the impact absorbing member 4 include a function which supports the bumper fascia 12 so that the bumper fascia 12 will not be lowered by its own weight, and a function which buffers (absorbs) an impact when the impact is applied to the fascia upper end plate 16 in the vertical direction (e.g., an impact caused by a collision of a pedestrian's head).

The impact absorbing member 4 has a given rigidity so that the function to support is achieved, and is made of a material having a given elasticity so that the function to buffer the impact is achieved. For example, a plastic material, such as polypropylene, is suitable for the impact absorbing member 4. The impact absorbing member 4 is comprised of an upper plate 41, a front plate 42, and a lower plate 43. As illustrated in FIGS. 4 and 5, the impact absorbing member 4 has, when viewed in a cross sectional perspective when cut in longitudinal directions of the vehicle 1, a pair of 'C' shapes, each having an open part 4H which is opened rearward. Dimensions of the upper plate 41 and the lower plate 43 in the longitudinal direction of the vehicle are substantially identical to a vertical dimension of the front plate 42.

Figure 14A:
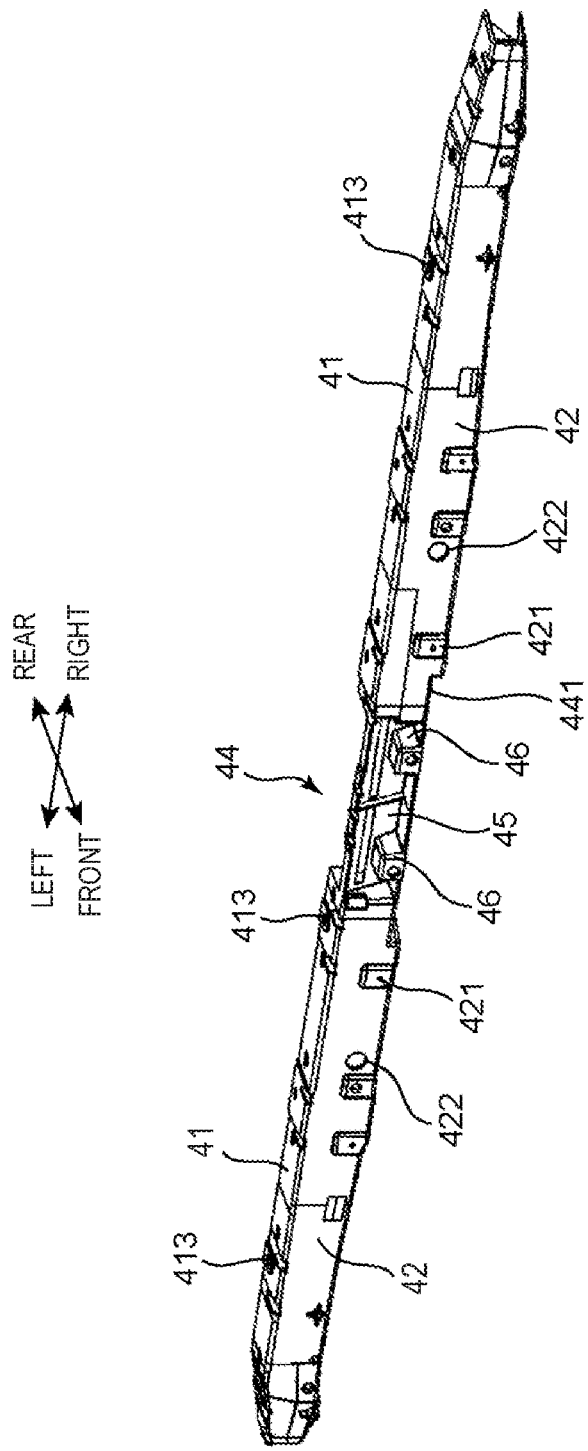
FIG. 14A is a perspective view of the impact absorbing member alone seen from right front.
Figure 15A:
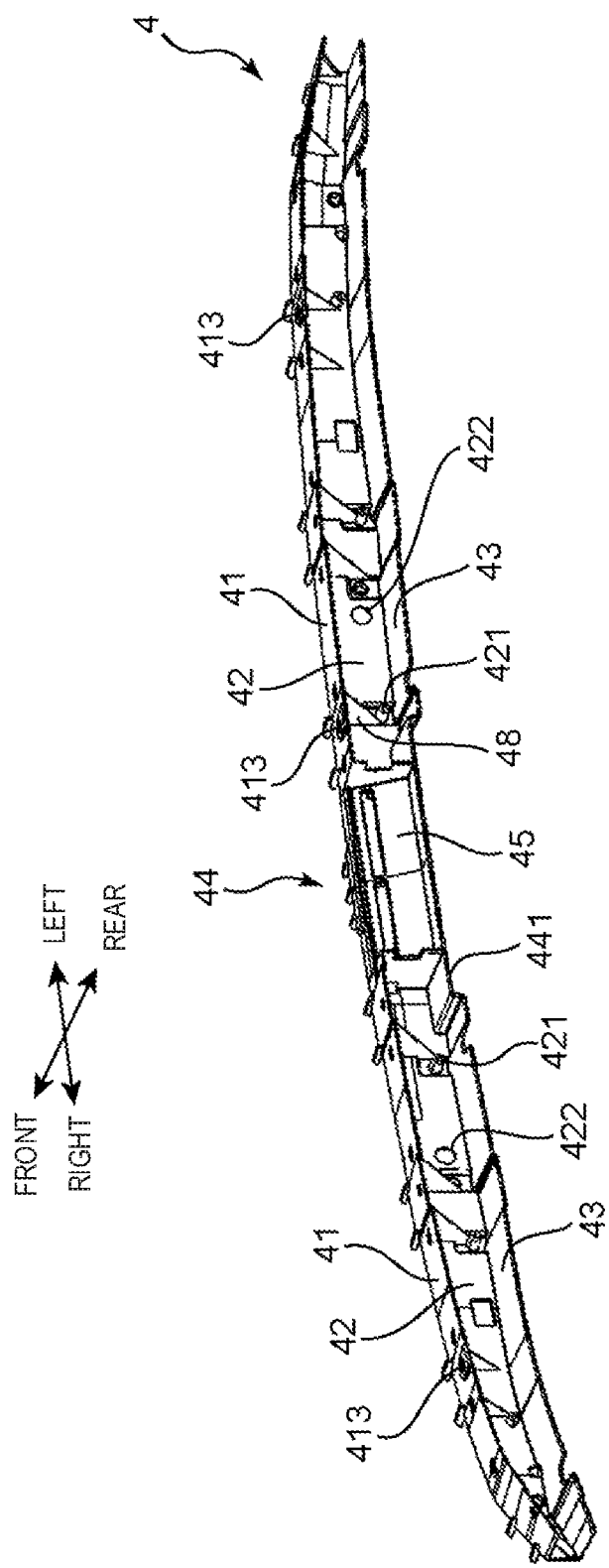
FIG. 15A is a perspective view of the impact absorbing member alone seen from right rear.

FIGS. 14A and 15A illustrate perspective views of the impact absorbing member 4 alone. As illustrated in FIGS. 4, 5, 14A and 15A, the upper plate 41 extends horizontally in longitudinal directions of the vehicle, opposes a bottom surface of the upper bracket 162, and has a support part 411 which supports the fascia upper end plate 16. The support part 411 is a rear portion of the upper plate 41, and supports a planar portion of the upper bracket 162, which is one step lower than the rest of the upper bracket 162. As illustrated in FIGS. 14A and 15A, fixing holes 413 are formed in the support part 411 so as to penetrate the support part 411 vertically. The upper bracket 162 and the upper plate 41 are integrally coupled to each other by fixing screws (not illustrated) which are inserted into the fixing holes 413 in a state where the upper bracket 162 and the upper plate 41 sandwich the covering member 5, which will be described later, therebetween.

The front plate 42 extends vertically so as to connect the leading edges of the upper plate 41 and the lower plate 43. The front plate 42 is located adjacent to and rearward of the parting line P. The front plate 42 is comprised of an upper part 42A which includes a substantially upper half thereof, and a lower part 42B which includes a substantially lower half thereof. The impact absorbing member 4 is mounted into the first recessed portions 33 so that the lower part 42B contacts the flange plates 35 and overlaps with the flange plates 35 in longitudinal directions of the vehicle. On the other hand, the upper part 42A does not overlap with the flange plates 35 in longitudinal directions of the vehicle so that it is not restrained by the flange plates 35.

Fastening holes 421 (fixed parts) which penetrate the front plate 42 in longitudinal directions of the vehicle are formed in the lower part 42B of the front plate 42. The impact absorbing member 4 is fixed to the first recessed portions 33 (flange plates 35) at locations of the fastening holes 421. That is, the fixed parts of the impact absorbing member 4 to the grille bracket 3 are disposed below the support part 411 which supports the fascia upper end plate 16. As illustrated in FIG. 5, the fixed parts are disposed above the planar parts 31 of the grille bracket 3 by a distance d1.

In a state where the fastening holes 421 and the first fastening holes 352 of the flange plates 35 are aligned, the second fixing screws 62 are inserted into these holes in the longitudinal direction of the vehicle. The second fixing screws 62 fasten the flange plates 35 to the lower part 42B of the front plate 42 in a state where heads 621 of the second fixing screws 62 contact front surfaces of the flange plates 35, and tip ends 622 of the second fixing screws 62 enter into the 'C'-shaped space of the impact absorbing member 4.

The lower plate 43 extends rearward from a lower end of the front plate 42. The lower plate 43 extends rearward parallel to the bottom plates of the first recessed portions 33, and has almost the same length in longitudinal directions of the vehicle as the bottom plate. A slight gap exists between the lower plate 43 and the bottom plates of the first recessed portions 33 in a state where the impact absorbing member 4 is fixed with the second fixing screws 62.

Figure 12:
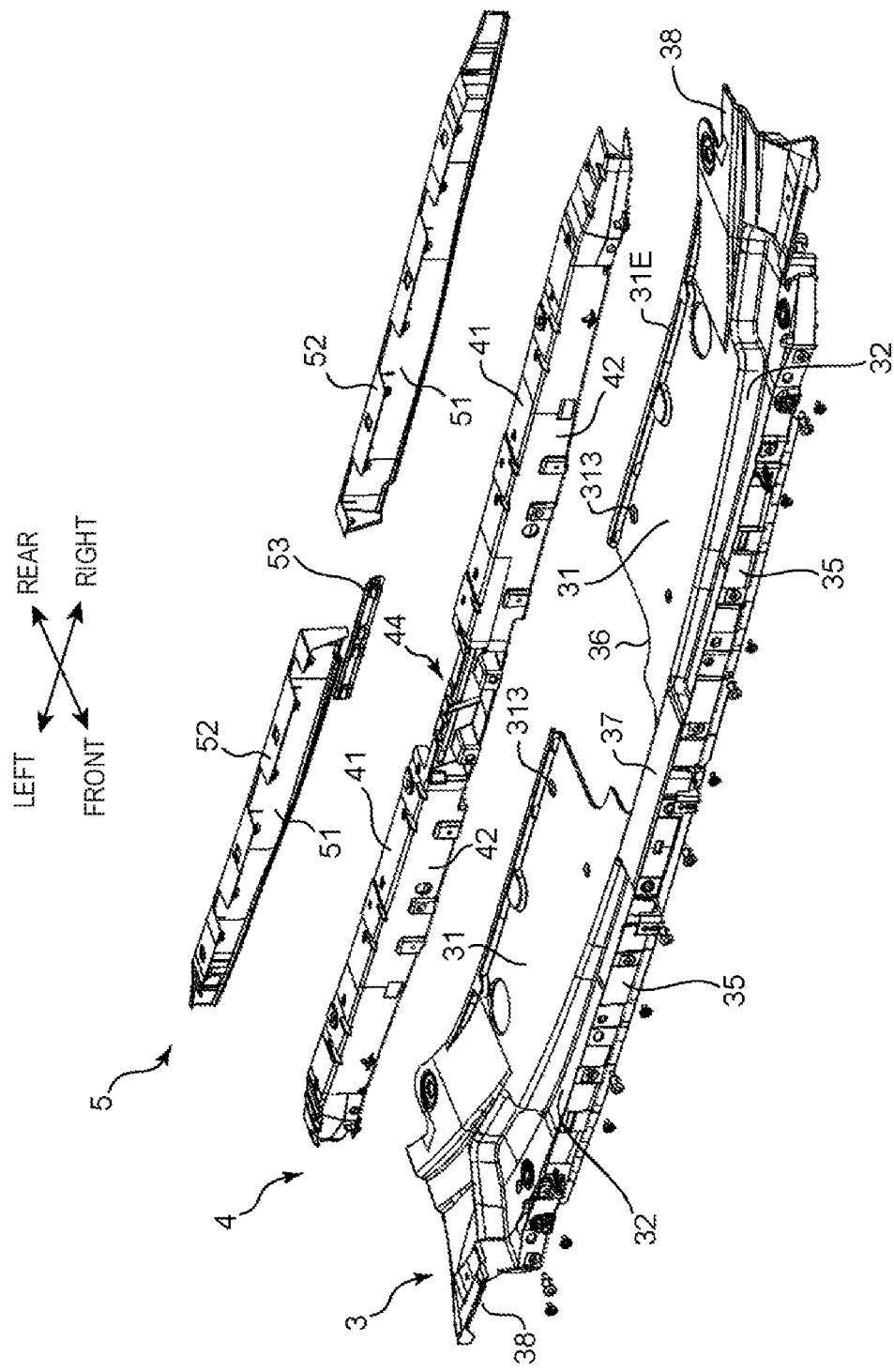
FIG. 12 is an exploded perspective view of the assembly.

The covering member 5 covers the open part 4H which is opened rearward, of the impact absorbing member 4 having the 'C' shape in cross section. FIG. 12 illustrates a perspective view of the covering member 5 alone. The covering member 5 is made of rubber or plastic, and has an angle shape in cross section comprised of a vertical plate 51 extending vertically and a side plate 52 extending horizontally forward from an upper end of the vertical plate 51. The vertical plate 51 has a vertical dimension slightly smaller than a vertical dimension of the open part 4H. Thus, a small gap is formed between a bottom edge of the vertical plate 51 and the bottom plates of the first recessed portions 33. The side plate 52 is fixed by being sandwiched between the upper plate 41 (support part 411) of the impact absorbing member 4 and the upper bracket 162 of the fascia upper end plate 16. Since the vertical plate 51 covers the open part 4H, the tip ends 622 of the second fixing screws 62 are not exposed and, therefore, an improved appearance can be obtained.

<Cross-Sectional Structure of Directly Connecting Part Between Grille Bracket and Bumper Fascia>

In the above, the cross-sectional structure of the part where the grille bracket 3 is coupled to the fascia upper end plate 16 of the bumper fascia 12 through the impact absorbing member 4 is described. The grille bracket 3 also has portions directly coupled to the bumper fascia 12. The directly-connecting part is below the coupling position between the fascia upper end plate 16 and the impact absorbing member 4. This cross-sectional structure is described with reference to FIG. 6.

FIG. 6 is a schematic cross-sectional view of the location which is shifted by a given distance in the width direction of the vehicle from the cross-sectional position of FIGS. 4 and 5. The front grille 13 has a grille upper end plate 131 extending horizontally and rearwardly from an upper end thereof. A lower bracket 164 formed in a lower part of a front end of the fascia upper end plate 16 is fixed and supported to/by a recessed portion formed in a front end of the grille upper end plate 131. That is, the front grille 13 and the fascia upper end plate 16 are structured to be an integrated member. A grille flange 132 (opposing plate) which rises vertically upward is formed in a rear end of the grille upper end plate 131. The grille flange 132 opposes the flange plates 35 of the grille bracket 3.

The flange plates 35 have second fastening holes 353 which penetrate the flange plates 35 in longitudinal directions of the vehicle. The second fastening holes 353 are threaded holes used for mounting the flange plates 35 to the grille flange 132. The grille flange 132 has threaded holes 133 at locations corresponding to the second fastening holes 353. Third fixing screws 63 are inserted into the holes 353 and 133 in the longitudinal direction of the vehicle. The third fixing screws 63 fastens the grille flange 132 and the flange plates 35 in a state where heads 631 of the third fixing screws 63 contact a front surface of the grille flange 132, and tip ends 632 of the third fixing screws 63 enter into the 'C'-shaped space of the impact absorbing member 4. Note that receiving holes 422, which allow the tip ends 632 of the third fixing screws 63 to escape from (but not interfere with) the impact absorbing member 4, are formed in the impact absorbing member 4.

As illustrated in FIG. 6, the mounted parts of the flange plates 35 to the grille flange 132 are located above the planar parts 31 of the grille bracket 3 by a distance d2. Moreover, since the grille bracket 3 is coupled to the shroud upper member 22 by the rear end parts 311 which are parts of the planar parts 31, the mounted parts are located above the coupled part by the distance d2. Furthermore, the distance d2 has substantially the same dimension as the distance d1 illustrated in FIG. 5. That is, the second fastening holes 353 of the flange plates 35 used as the mounted parts to the grille flange 132 are disposed substantially at the same height of the fastening holes 421 used as the fixed parts of the impact absorbing member 4 to the flange plates 35. Therefore, even if a structure in which the grille flange 132 and the flange plates 35 as well as the impact absorbing member 4 are fastened to each other with the third fixing screws 63 at the second fastening holes 353 is adopted (in the above embodiment, the tip end portions 632 of the third fixing screws 63 are allowed to escape by the receiving holes 422), the deformation stroke of the front plate 42 will not be smaller.

<Cross-Sectional Structure of Accessible Space>

FIG. 7 is a schematic cross-sectional view taken along a line VII-VII in FIG. 2, and is a cross-sectional view of the central portion in width directions of the vehicle where the accessible space AS exists. Also referring to FIG. 13, the grille bracket 3 has a notch 36 at the center in width directions of the vehicle. The planar part is divided into two planar parts 31 on the left and right by the notch 36. A flat central portion 37 is formed in front of the notch 36. The central portion 37 is a horizontal surface located slightly above the planar parts 31, and the recessed portion is divided into two recessed portions 32 on the left and right by the central portion 37. A lower surface of the central portion 37 is supported by a support piece 7.

Also referring to FIGS. 14A to 15B, a central portion 44 of the impact absorbing member 4 in the width direction of the vehicle is provided with a standing wall portion 45 and accommodating portions 46. The standing wall portion 45 is an inclined wall extending between the upper bracket 162 of the fascia upper end plate 16 and the central portion 37 of the grille bracket 3. The standing wall portion 45 is comprised of an inclined plate 451, an upper horizontal plate 452 extending forward from an upper end of the inclined plate 451, and a lower horizontal plate 453 extending from a lower end of the inclined plate 451 in the longitudinal direction of the vehicle. The inclined plate 451 is inclined rearward and downward where the upper end is located forward and the lower end is located rearward. The upper horizontal plate 452 supports the upper bracket 162, and the lower horizontal plate 453 contacts the central portion 37.

The accommodating portions 46 are portions which are integrally formed in the standing wall portion 45 in a bulged fashion, in a lower part on a front surface side of the standing wall portion 45 (below the upper horizontal plate 452). The accommodating portions 46 form accommodating spaces where the second fixing screws 62 which fix the impact absorbing member 4 to the flange plates 35 in the central portion 44 are accommodated, and have a box shape which is opened downwardly. That is, the lower horizontal plate 453 does not exist at locations corresponding to the bottom surfaces of the accommodating portions 46. Inserting holes 461 with which the second fixing screws 62 threadedly engage are formed in front walls of the accommodating portions 46. Since such accommodating portions 46 are formed, user's fingers will not interfere with the second fixing screws 62 when the user inserts his/her fingers into the accessible space AS in order to open the hood 11.

Slits 47 which are elongated in width directions of the vehicle are formed adjacent to the upper end of the inclined plate 451. The slits 47 are formed in order to adjust the rigidity of the standing wall portion 45 so that it does not become too high. Since the slits 47 are formed, the mechanical strength of the standing wall portion 45 is reduced, and a proper impact absorbing function can be given to the standing wall portion 45. A slit cover 53 made of a material having lower elasticity than the impact absorbing member 4 is fitted into the slit 47.

[External Structure of Vehicle Front Part]

Figure 8:
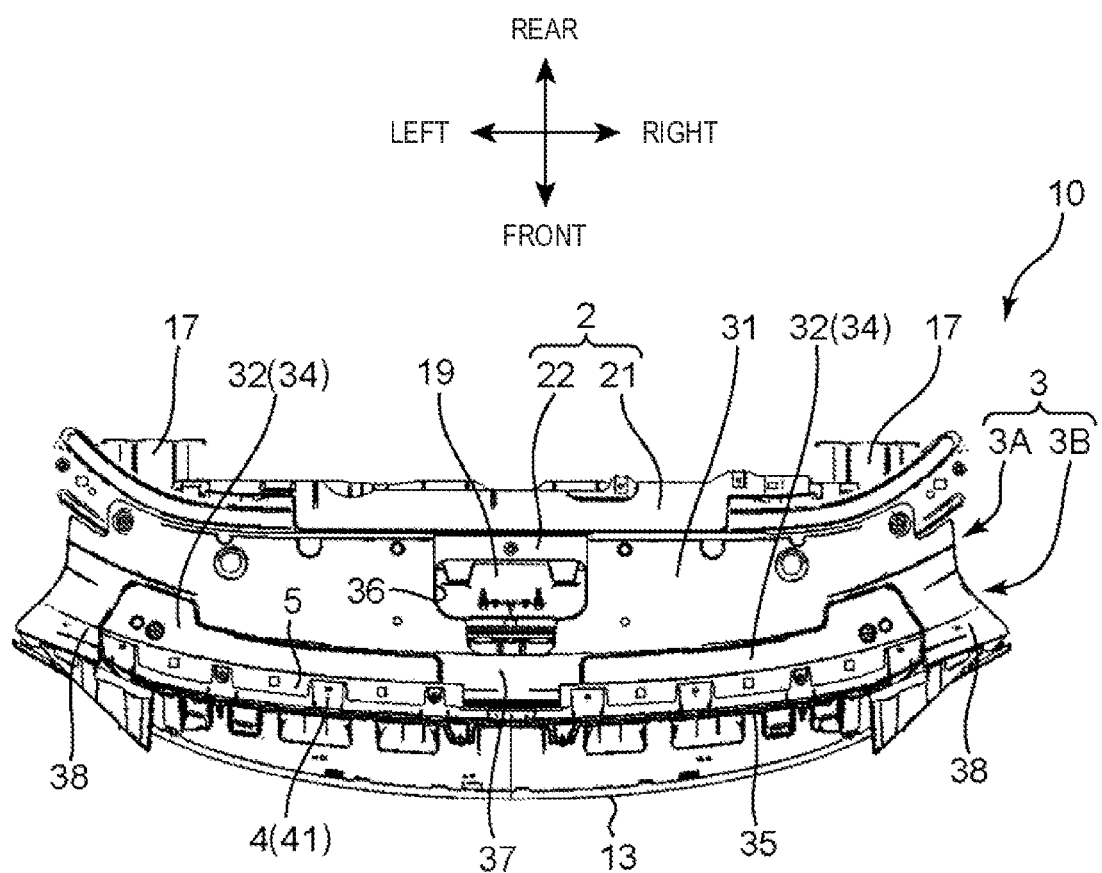
FIG. 8 is a plan view of the front part structure of the vehicle.

Next, an external structure of the front part 10 of the vehicle 1 is described. FIG. 8 is a plan view of the front part 10, FIG. 9 is a plan view illustrating the state in FIG. 8, from which upper the front grille 13 is removed, and FIG. 10 is a plan view illustrating the state in FIG. 9 from which an assembly of the grille bracket 3, the impact absorbing member 4 and the covering member 5 is removed.

The grille bracket 3 has a lateral width which substantially corresponds to the vehicle width of the vehicle 1, the rear portion 3A thereof is placed over the shroud upper member 22 in an overlapped manner, and the front portion 3B thereof is located adjacent to the front grille 13. As already described, the notch 36, which is formed by cutting off a part of the planar parts 31, is formed in the central portion of the grille bracket 3 in the lateral directions. The notch 36 is formed in order to form a space where a latch unit 19 which forms an engagement support structure for the leading edge 11F of the hood 11 is accommodated. Note that an opening is also formed in the shroud upper member 22 at a location corresponding to the notch 36.

Figure 10:
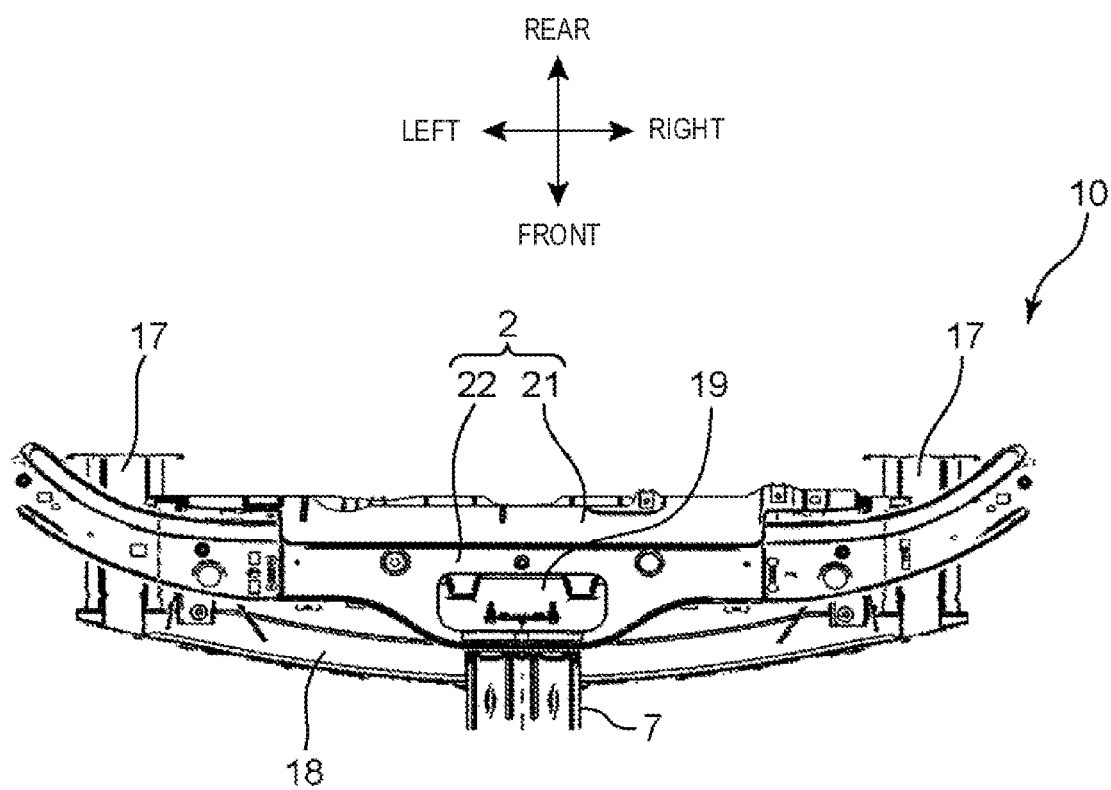
FIG. 10 is a plan view illustrating the state in FIG. 9, from which a grille bracket is removed.

As illustrated in FIG. 10, the support piece 7 is comprised of a plate member having high rigidity which has a given width in the width direction of the vehicle, and is located at the center in the width direction of the vehicle. A lower end of the support piece 7 is supported by a bumper reinforcement 18 which is held by front side frames 17 at left and right end portions thereof, and an upper end thereof contacts and the upper end thereof is fixed to a lower surface of the central portion 37 of the grille bracket 3. In the grille bracket 3, the portion where the notch 36 is formed is used for reducing the mechanical strength. Instead, since the bumper fascia 12 is structured such that the central portion 37 located in front of the notch 36 is supported by the support piece 7, the supporting rigidity of the bumper fascia 12 is secured.

Figure 9:
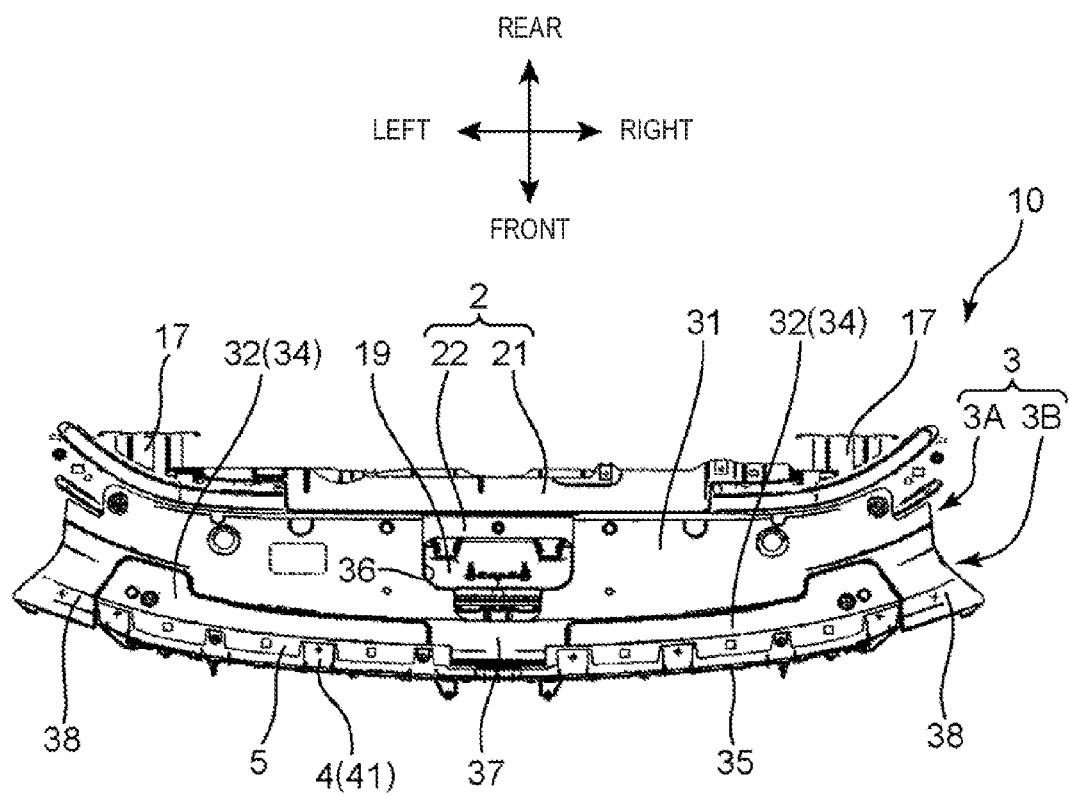
FIG. 9 is a plan view illustrating the state in FIG. 8, from which a front grille is removed.

As illustrated in FIGS. 8 and 9, the flange plates 35 and the recessed portions 32 of the grille bracket 3 are curved loosely in width directions of the vehicle so as to conform to the curved shape of the front part 10. The central portion 37 divides the recessed portion into two recessed portions 32 at the center in the width direction of the vehicle. Only the second recessed portions 34 of the recessed portions 32 are exposed upwardly. The first recessed portions 33 are completely covered by placing the impact absorbing member 4 and the covering member 5 which are curved according to the curved shape of the recessed portions 32.

Figure 11:
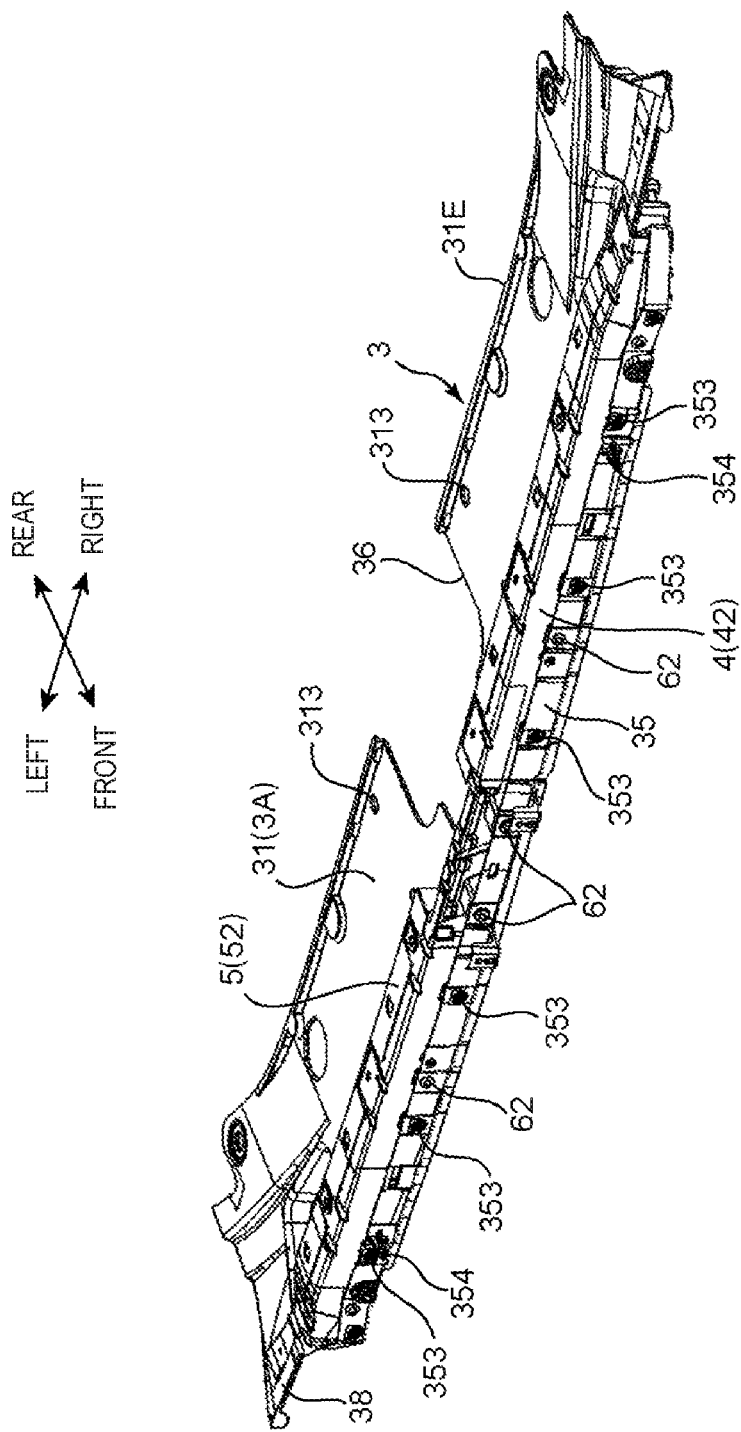
FIG. 11 is a perspective view illustrating an assembly of the grille bracket, an impact absorbing member, and a covering member.
Figure 14B:
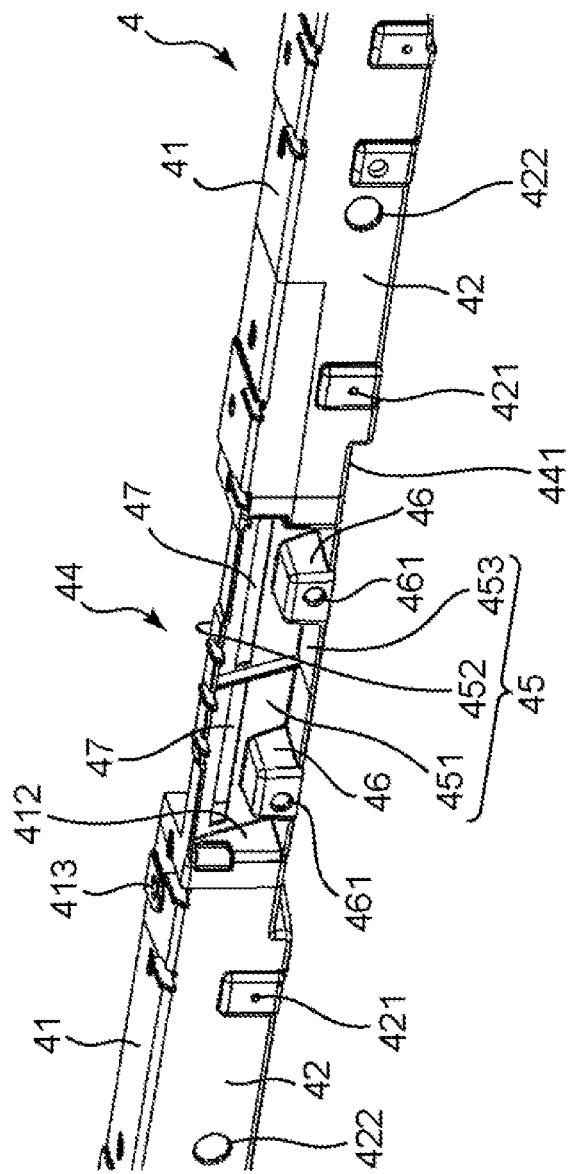
FIG. 14B is a magnified perspective view of FIG. 14A.
Figure 15B:
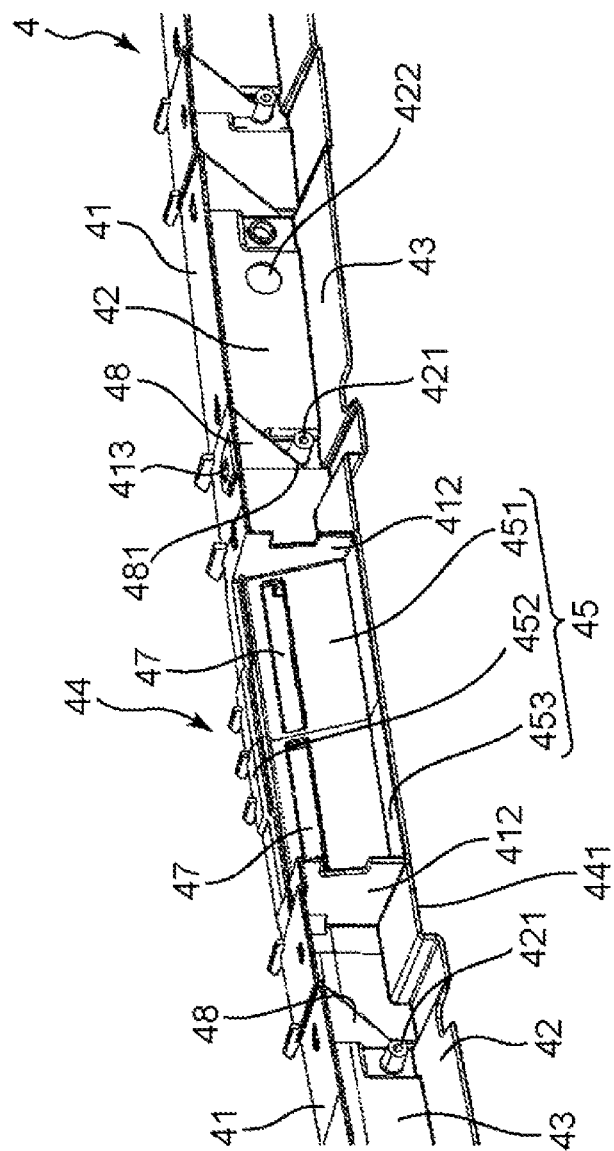
FIG. 15B is a magnified perspective view of FIG. 15A.

FIG. 11 is a perspective view illustrating the assembly of the grille bracket 3, the impact absorbing member 4 and the covering member 5, and FIG. 12 is an exploded perspective view of the assembly. FIG. 13 is a perspective view of the grille bracket 3 alone, where the perspective viewing direction is reversed from FIG. 12. FIG. 14A is a perspective view of the impact absorbing member 4 alone seen from right front, and FIG. 14B is a magnified perspective view of FIG. 14A. FIG. 15A is a perspective view of the impact absorbing member 4 alone seen from right rear, and FIG. 15B is a magnified perspective view of FIG. 15A.

<Grille Bracket>

FIG. 11 illustrates one example in which six second fixing screws 62 are threadedly engaged with the flange plates 35 so as to be spaced from each other in width directions of the vehicle. These second fixing screws 62 fix the flange plates 35 to the front plate 42 of the impact absorbing member 4. FIG. 11 also illustrates one example in which six second fastening holes 353, used as the mounted parts to the grille flange 132 of the flange plates 35, are located at a substantially equal distance in width directions of the vehicle. Pins 354 are provided so as to project forward from front surfaces of the flange plates 35. The pins 354 are fitted into receiving holes formed in the grille flange 132 to align the flange plates 35 with the grille flange 132 before being fastened with the third fixing screws 63.

In this illustration, two threaded holes 313 used as the coupled parts to the shroud upper member 22 are formed in the rear end parts 311 so as to have the notch 36 therebetween. Note that threaded holes 314 for fixing the grille bracket 3 to a retaining frame of the shroud 2 are formed near side end portions 38 of the planar parts 31.

The lateral width of the recessed portions 32 is slightly shorter than the lateral width of the grille bracket 3. Thus, the side end portions 38 where the recessed portions 32 do not exist are provided at both left and right ends of the front portion 3B. Since the impact absorbing member 4 and the covering member 5 are members which are placed onto the first recessed portions 33 of the recessed portions 32, the lateral widths of the members are also made shorter than the lateral width of the grille bracket 3.

With reference to FIG. 13, the first recessed portions 33 have a substantially uniform dimension in the longitudinal direction of the vehicle, and a height of the bottom plates thereof is such that they are slightly dented below the central portion 37. Meanwhile, the second recessed portions 34 have a dimension in the longitudinal direction of the vehicle wide near the left and right ends. The height of the bottom plates of the second recessed portions 34 are considerably dented relative to the height of the central portion 37. The drain holes 341 are located near the wide parts on the left and right sides.

<Impact Absorbing Member>

Also referring to FIGS. 14A to 15B, the impact absorbing member 4 has a pair of left and right portions having the 'C' shape in the cross section described above, each of which is comprised of the upper plate 41, the front plate 42, and the lower plate 43, and the central portion 44 is located at the center between the 'C'-shaped portions. A plurality of fixing holes 413 for fixing the impact absorbing member 4 to the fascia upper end plate 16 are formed in the upper plate 41. A plurality of the fastening holes 421 for fixing the impact absorbing member 4 to the grille bracket 3 and a plurality of the receiving holes 422, which allow the third fixing screws 63 for fastening the grille flange 132 with the flange plates 35 to escape, are formed in the front plate 42.

The lower plate 43 is provided with a receiving recessed portion 441 in a part where the central portion 44 exists. The receiving recessed portion 441 is dented upwardly from other portions of the lower plate 43, and the central portion 37 of the grille bracket 30 is fitted therein. That is, the central portion 37 is a portion which slightly projects upward from the bottom plates of the first recessed portions 33 (FIG. 13), and the receiving recessed portion 441 which is dented upward so that it fits into the projected portion is formed in the lower plate 43. Thus, this portion of this receiving recessed portion 441 is supported by the support piece 7 through the central portion 37. The lateral widths of the receiving recessed portion 441, the central portion 37, and the support piece 7 are substantially identical.

Above the receiving recessed portion 441, a pair of partition plates 412 are provided at both left and right ends of the standing wall portion 45. Each partition plate 412 is a plate which extends vertically, and perpendicular to the front plate 42, an upper end thereof is coupled to the upper plate 41 and the upper horizontal plate 452, a lower end thereof is coupled to the lower plate 43 and the lower horizontal plate 453, and a front end thereof is coupled to the front plate 42. That is, the pair of partition plates 412 laterally sandwiches the standing wall portion 45 therebetween, and divides the central portion 37 from the 'C'-shaped portion. In terms of a spatial relation with the support piece 7, the pair of partition plates 412 are located within a lateral range of a width of the support piece 7 and, preferably, above locations of both left and right ends of the support piece 7.

The partition plates 412 function to reinforce the mechanical strength of the impact absorbing member 4 within the range of the central portion 44. As already described, since the central portion 37 is reduced in the mechanical strength by forming the notch 36 in the grille bracket 3, the central portion 37 is supported by the support piece 7. Since the recessed portion 441 onto which the pair of partition plates 412 are provided so as to stand exists over the central portion 37, the supporting rigidity of the bumper fascia 12, part of which relies on the impact absorbing member 4 alone, is increased. Note that, although the slit 47 is formed in the standing wall portion 45 so that the mechanical strength thereof is positively reduced, the pair of partition plates 412 compensate (or reinforce) for the otherwise lowered supporting rigidity of the central portion 44.

As illustrated in FIGS. 15A and 15B, the impact absorbing member 4 is provided with a plurality of reinforcement ribs 48 inside the 'C'-shaped portion. The reinforcement ribs 48 are triangular plates which connect the front plate 42 with the upper plate 41, and the plate surface thereof is oriented in a direction perpendicular to the front plate 42. Lower ends 481 of the reinforcement ribs 48 are separated from the lower plate 43 by a given distance.

The strength of the 'C'-shaped portion is reinforced by the reinforcement ribs 48, and the supporting rigidity of the bumper fascia 12 caused by the impact absorbing member 4 is thus increased. Here, if a plurality of ribs which connect the upper plate 41 with the lower plate 43, similarly to the partition plates 412, are provided inside the 'C'-shaped portion, the strength may be raised too much, resulting in a waste of a vertical impact absorbing capability of the impact absorbing member 4. Therefore, in this embodiment, since the lower ends 481 of the reinforcement ribs 48 are separated from the lower plate 43, the impact absorbing capability is maintained without being significantly lowered.

<Covering Member>

A pair of left and right covering members 5 are prepared so as to cover the respective open parts 4H of the 'C'-shaped portions on the left and right sides of the central portion 44 of the impact absorbing member 4. The slit cover 53 has a laterally elongated shape corresponding to the slits 47 formed in the standing wall portion 45, and is provided with a hook which engages with a wall surface which laterally divides the slits 47. Thus, since the vertical plates 51 of the covering members 5 cover the open parts 4H, the appearance is improved as already described, and an entry of water and dust via the open parts 4H into the spaces of the 'C'-shaped portions is prevented. Therefore, the durability of the impact absorbing member is increased.

Note that the rigidity of the impact absorbing member 4 is less than that of the grille bracket 3, and the rigidity of the covering member 5 is less than that of the impact absorbing member 4. The rigidity covering member 5 is made the lowest so as not to disturb a deformation of the impact absorbing member 4.

[Operation and Effects]

According to the front part structure of the vehicle in accordance with the embodiment described above, the following operation and effects are obtained. First, the fascia upper end plate 16 of the bumper fascia 12 is coupled to the shroud upper member 22 by the integrated part comprised of the grille bracket 3 and the impact absorbing member 4, not by the highly-rigid grille bracket 3 alone. That is, the fascia upper end plate 16 is supported by the shroud 2 via the integrated part comprised of the grille bracket 3 and the impact absorbing member 4. Therefore, the lowering of the bumper fascia 12 by its own weight is prevented. In addition, the impact absorbing member 4 intervenes between the fascia upper end plate 16 and the grille bracket 3, and the fascia upper end plate 16 is supported by the impact absorbing member 4. Therefore, even if a vertical impact caused by a collision of an object, such as a pedestrian's head, is applied to the fascia upper end plate 16, the impact is buffered by the impact absorbing member 4. Accordingly, the structure contributes to a protection of the pedestrian's head.

The impact absorbing member 4 is comprised of the upper plate 41, the front plate 42 and a lower plate 43, and has a 'C' shape which is opened rearward. The upper bracket 162 of the fascia upper end plate 16 is supported by the upper plate 41, and the front plate 42 is fixed to the front portion 3B (flange plates 35) of the grille bracket 3. Thus, since the structure in which no standing wall is provided rearward is adopted, the upper plate 41 can easily be deformed downwardly, and the impact absorbing member 4 has an easy-to-deform characteristic. In addition, since the upper plate 41 receives a load from the fascia upper end plate 16 and the front plate 42 is fixed to the grille bracket 3, the impact absorbing member 4 can easily absorb an impact applied downwardly from above.

The front plate 42 of the impact absorbing member 4 is located near and behind the parting line P which is formed by the fascia upper end plate 16 and the leading edge 11F of the hood 11. A load caused by the own weight of the hood 11 is transmitted to the upper bracket 162 near the parting line P, similarly to when an impact load is applied to the hood 11. Since the front plate 42 comprised of the standing wall extending vertically is located near and behind the parting line P, the impact absorbing member 4 suitably receives not only the load of the bumper fascia 12, but also the load of the hood 11. Therefore, not only the lowering of the bumper fascia 12 by its own weight, but also the lowering of the hood 11 by its own weight is suitably prevented.

Moreover, the front plate 42 of the impact absorbing member 4 overlaps with the flange plates 35 of the grille bracket 3 in the longitudinal direction of the vehicle, and is comprised of the lower part 42B fixed with the flange plates 35 and the second fixing screws 62, and the upper part 42A which does not overlap with the flange plates 35 in the longitudinal direction of the vehicle. Therefore, the upper part 42A, having the vertical dimension corresponds to about an upper half of the front plate 42, is usable as a portion which deforms elastically when a load is applied to the bumper fascia 12.

With reference to FIG. 5, if an impact load is applied to the fascia upper end plate 16 or the leading edge 11F of the hood 11, the load will be transmitted from the upper bracket 162 to the upper plate 41 of the impact absorbing member 4. Here, since no standing wall exists in the rearward open part 4H, the impact absorbing member 4 deforms so that the rear end of the upper plate 41 sinks downwardly. The parts that are subject to such a deformation are a corner part between the front plate 42 and the upper plate 41, as well as the upper part 42A of the front plate 42. In this embodiment, a deformation stroke of the upper plate 41 is increased by the existence of the upper part 42A. Such a deformation is described in more detail with reference to FIGS. 16A and 16B.

Figure 16A:
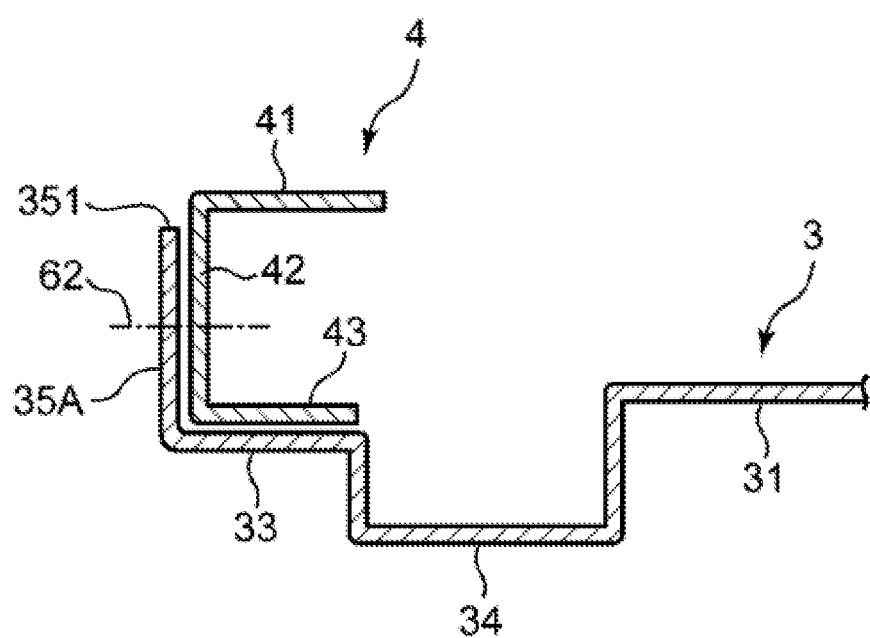
FIG. 16A is a cross-sectional view illustrating a comparative example (modification) of a fixing structure of a grille bracket and an impact absorbing member.

FIG. 16A is a cross-sectional view illustrating a comparative example of the fixing structure of the grille bracket 3 and the impact absorbing member 4. This comparative example is also one of the embodiments of the present invention. FIG. 16A illustrates a mode in which a vertical dimension of the flange plates 35A of the grille bracket 3 is almost equal to that of the front plate 42 of the impact absorbing member 4, and the front plate 42 is fixed so as to overlap with the flange plates 35A in longitudinal directions of the vehicle. In this case, the front plate 42 cannot be deformed because it is restrained by the flange plates 35A, so that only the corner part between the front plate 42 and the upper plate 41 can be deformed. Therefore, the deformation stroke of the upper plate 41 is small.

Figure 16B:
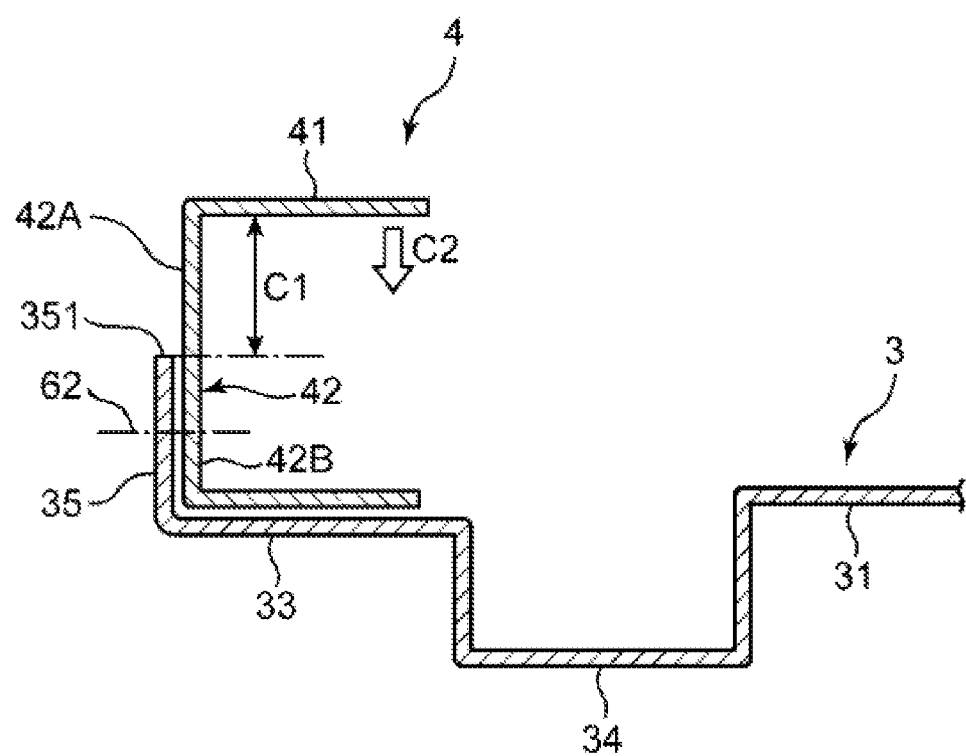
FIG. 16B is a cross-sectional view illustrating a fixing structure of the grille bracket and the impact absorbing member of this embodiment.

FIG. 16B is a cross-sectional view illustrating the fixing structure of the grille bracket 3 and the impact absorbing member 4 of this embodiment. As described above, the front plate 42 is comprised of the upper part 42A, which does not overlap with the flange plates 35, and the upper part 42A is elastically deformable. That is, since an area C1 ranging from the corner part between the front plate 42 and the upper plate 41 to upper edges 351 of the flange plates 35 is deformable in the front plate 42, the downward deformation stroke of the rear end of the upper plate 41 in an arrow C2 direction is increased. Therefore, the impact absorbing member 4 suitably absorbs the impact.

Moreover, as illustrated in FIG. 5, since the front plate 42 overlaps with the flange plates 35 in longitudinal directions of the vehicle, the inserting direction of the second fixing screws 62, which fix the front plate 42 to the flange plates 35, is also oriented parallel to longitudinal directions of the vehicle. Therefore, considering a case where the pedestrian's head comes downwardly to the fascia upper end plate 16 from above, the tip ends 622 of the second fixing screws 62 may be structured so as not to point upward.

As illustrated in FIG. 6, the bumper fascia 12 has the grille flange 132, and the grille flange 132 is mounted with the third fixing screws 63 through the second fastening holes 353 of the flange plates 35. Thus, since the grille bracket 3 is further provided with the portion which is directly mounted to the bumper fascia 12 without intervention by the impact absorbing member 4, the supporting state of the bumper fascia 12 is stabilized.

As illustrated in FIG. 5, the fastening holes 421, (second fixing screws 62) used as the fixed parts of the impact absorbing member 4 to the grille bracket 3, are located above the planar parts 31 of the grille bracket 3 by the distance d1. In addition, the grille bracket 3 is fixed to the shroud upper member 22 in the rear end parts 311, which are located at the same height as the planar parts 31. Thus, since the fixed parts are located above the planar parts 31, a moment of inertia can be caused by applying the load downwardly to the front portion 3B (the flange plates 35 and the first recessed portions 33) of the grille bracket 3, which is supportable by high rigidity.

Moreover, the mounted parts using the second fastening holes 353 are located above the positions where the rear end parts 311 of the grille bracket 3 are coupled to the shroud upper member 22 with the first fixing screws 61, by the distance d2. Therefore, a moment of inertia can be caused by applying the load downwardly to the front portion 3B of the grille bracket 3, which is supportable by high rigidity.

DESCRIPTION OF MODIFICATIONS

As described above, although one embodiment of the present invention is described, the present invention is not limited to the above embodiment and can be modified as follows.

(1) In the above embodiment, one example in which the rear end parts 311 of the grille bracket 3 are fixed to the shroud upper member 22 is illustrated. Alternatively, the rear end parts 311 may be mounted to the shroud panel 21.

(2) In the above embodiment, one example, in which the fastening holes 421 of the impact absorbing member 4 used as the fixed parts to the grille bracket 3 (flange plates 35) are formed in the front plate 42, is illustrated. Alternatively, threaded holes corresponding to the fastening holes 421 may be formed in the lower plate 43. That is, the lower plate 43 may also be fixed to the front portion 3B of the grille bracket 3.

(3) In the above embodiment, one example is illustrated in which the recessed portions 32 are formed in the front portion 3B of the grille bracket 3, and the impact absorbing member 4 is placed on the recessed portions 32 (first recessed portions 33). The front portion 3B may also be formed into a planar part without the recessed portions 32 being provided, and the impact absorbing member 4 may be placed on the planar part. In that case, it is desirable to provide a rigid reinforcement structure, such as ribs, in the front portion 3B, instead of forming the recessed portions 32.

(4) In the above embodiment, one example in which the impact absorbing member 4 has the 'C' shape in cross section comprised of the upper plate 41, the front plate 42 and the lower plate 43 is illustrated. This is merely an example, and the shape of the impact absorbing member 4 is not limited to the illustrated shape, as long as the impact absorbing member 4 has the support part which is lower in rigidity than the grille bracket 3 and supports the upper end portion of the bumper fascia 12, and the fixed part which is located below the support part and fixed to a part of the grille bracket 3. For example, the impact absorbing member 4 may have a tube-like shape of a quadrangle or circle in cross section. Moreover, the impact absorbing member 4 may also be made of a sponge-like material.

Figure 17A:
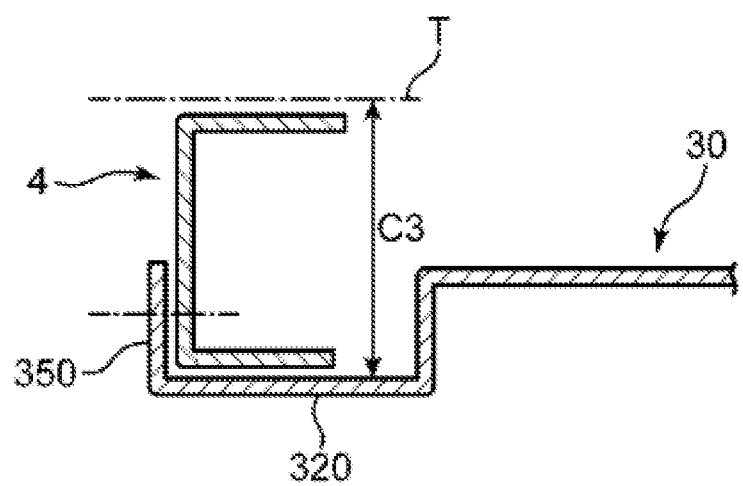
FIG. 17A is a cross-sectional view illustrating a fixing structure of a grille bracket and an impact absorbing member according to a modification.

(5) In the above embodiment, one example, in which each of the recessed portions 32 of the grille bracket 3 is comprised of two stages, the first recessed portions 33 and the second recessed portions 34 which are different in the dented depth, is illustrated. However, the recessed portions 32 may be simple one-stage recessed portions. FIG. 17A is a cross-sectional view illustrating a fixing structure of a grille bracket 30 and the impact absorbing member 4 according to a modification. The grille bracket 30 is formed with recessed portions 320, each comprised of a one-stage dent. Front walls of the recessed portions 320 are flange plates 350. A reference character "T" in the drawing illustrates a mounting surface of the fascia upper end plate 16. In this modification, a space having a vertical distance C3 between the mounting surface T and a bottom plate of the recessed portion 320 can be used as a space where the impact absorbing member 4 is accommodated.

Figure 17B:
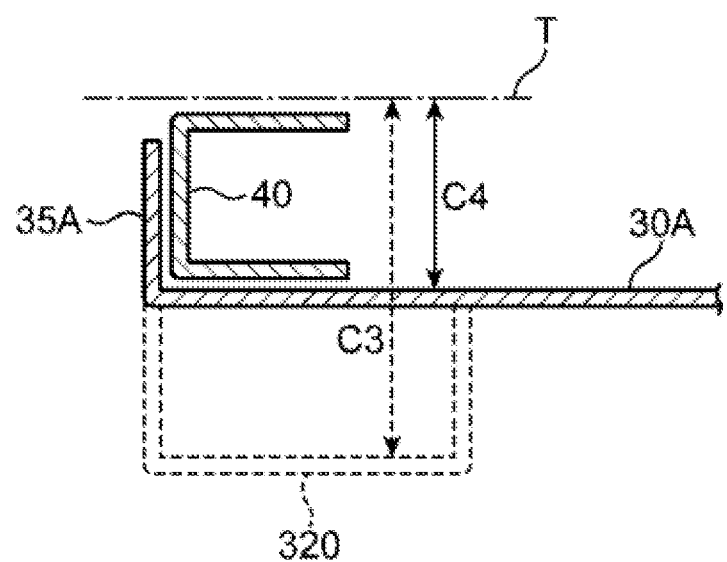
FIG. 17B is a cross-sectional view illustrating a fixing structure of a grille bracket and an impact absorbing member according to a comparative example.

On the other hand, FIG. 17B is a cross-sectional view illustrating a fixing structure of a grille bracket 30A and an impact absorbing member 40 according to a comparative example. The grille bracket 30A is comprised of a planar member without recessed portions, and is provided with flange plates 35A at a front end thereof. In this comparative example, a space having a vertical distance C4 between the mounting surface T and the grille bracket 30A can be used as a space where the impact absorbing member 40 is accommodated. Since the distance C4 is shorter than the distance C3 by the vertical dimension of the recessed portion 320, the vertical dimension of the impact absorbing member 40 also becomes smaller. Therefore, a deformation stroke of the impact absorbing member 40 is reduced. Since the height of the grille bracket may often be defined based on other components, such as the shroud 2, the above modification is useful if the vertical distance of the grille bracket from the mounting surface T cannot be fully utilized.

It should be understood that the embodiments herein are illustrative and not restrictive, since the scope of the invention is defined by the appended claims rather than by the description preceding them, and all changes that fall within metes and bounds of the claims, or equivalence of such metes and bounds thereof, are therefore intended to be embraced by the claims.

DESCRIPTION OF REFERENCE NUMERALS

1 Vehicle
10 Front Part
11 Hood
11F Leading Edge
12 Bumper Fascia
13 Front Grille
132 Grille Flange (Opposing Plate)
16 Fascia Upper End Plate (Upper End Part of Bumper Fascia)
2 Shroud
3 Grille Bracket (Coupling Member)
3A Rear Portion
3B Front Portion
31 Planar Part
311 Rear End Part (First Portion)
32 Recessed Portion
33 First Recessed Portion (Second Portion)
35 Flange Plate
341 Drain Hole
353 Second Fastening Hole (Mounted Part)
4 Impact Absorbing Member
4H Open Part
41, 42, 43 Upper Plate, Front Plate, Lower Plate
411 Support Part
42A, 42B Upper Part, Lower Part
421 Fastening Hole (Fixed Part)
48 Reinforcement Rib
5 Covering Member
P Parting Line

What is claimed is:

1. A front part structure of a vehicle, comprising:
a bumper fascia disposed at a front part of the vehicle and having an upper end portion opposing a leading edge of a hood;
a shroud disposed rearward from the bumper fascia, and configured to lead cooling air to a given device;
a coupling member provided with a first portion coupled to the shroud and a second portion located forward of the first portion and below the upper end portion of the bumper fascia; and
an impact absorbing member provided with a support part and a fixed part, wherein
the support part intervenes between the upper end portion of the bumper fascia and the second portion of the coupling member, and supports the upper end portion; and
the fixed part is disposed below the support part and is fixed to the second portion.

2. The front part structure of claim 1, wherein
the impact absorbing member is provided with an upper plate, a front plate, and a lower plate, and has a 'C' shape that is opened rearward, when viewed in a cross sectional perspective thereof in longitudinal directions of the vehicle;
the support part is provided to the upper plate; and
the fixed part is provided to one of the front plate and the lower plate.

3. The front part structure of claim 2, wherein the impact absorbing member is disposed so that the front plate is located adjacent to and rearward of a parting line that is formed between the upper end portion of the bumper fascia and the leading edge of the hood.

4. The front part structure of claim 2, wherein
the second portion of the coupling member is provided with a flange plate extending upwardly; and
the front plate of the impact absorbing member is provided with:
a lower part that is disposed so as to overlap with the flange plate in longitudinal directions of the vehicle, and forms the fixed part; and
an upper part that does not overlap with the flange plate in longitudinal directions of the vehicle.

5. The front part structure of claim 3, wherein
the second portion of the coupling member is provided with a flange plate extending upwardly; and
the front plate of the impact absorbing member is provided with:
a lower part that is disposed so as to overlap with the flange plate in longitudinal directions of the vehicle, and forms the fixed part; and
an upper part that does not overlap with the flange plate in longitudinal directions of the vehicle.

6. The front part structure of claim 4, wherein
the bumper fascia has an opposing plate that opposes the flange plate of the coupling member;
the flange plate has a mounted part to the opposing plate; and
the mounted part is disposed above a location where the first portion of the coupling member is coupled to the shroud.

7. The front part structure of claim 5, wherein
the bumper fascia has an opposing plate that opposes the flange plate of the coupling member;
the flange plate has a mounted part to the opposing plate; and
the mounted part is disposed above a location where the first portion of the coupling member is coupled to the shroud.

8. The front part structure of claim 2, wherein
the impact absorbing member is provided with a reinforcement rib that couples the front plate to the upper plate; and
a lower end of the reinforcement rib is disposed so as to be separated from the lower plate by a given distance.

9. The front part structure of claim 2, further comprising a covering member configured to cover a portion of the impact absorbing member that is opened rearward.

10. A front part structure of a vehicle, comprising:
a bumper fascia disposed at a front part of the vehicle and having an upper end portion opposing to a leading edge of a hood;
a shroud disposed rearward from the bumper fascia, and configured to lead cooling air to a given device;
a coupling member provided with a first portion coupled to the shroud and a second portion located forward of the first portion and below the upper end portion of the bumper fascia;
an impact absorbing member provided with a support part and a fixed part; and
a covering member configured to cover a portion of the impact absorbing member that is opened rearward, wherein
the support part intervenes between the upper end portion of the bumper fascia and the second portion of the coupling member, and supports the upper end portion;
the fixed part is disposed below the support part and is fixed to the second portion;
the impact absorbing member is provided with an upper plate, a front plate, and a lower plate, and has a 'C' shape that is opened rearward, when viewed in a cross sectional perspective thereof in longitudinal directions of the vehicle;
the support part is provided to the upper plate;
the fixed part is provided to one of the front plate and the lower plate;
the impact absorbing member is disposed so that the front plate is located adjacent to and rearward of a parting line that is formed between the upper end portion of the bumper fascia and the leading edge of the hood;
the second portion of the coupling member is provided with a flange plate extending upwardly;
the front plate of the impact absorbing member is provided with:
a lower part that is disposed so as to overlap with the flange plate in longitudinal directions of the vehicle, and forms the fixed part, and
an upper part that does not overlap with the flange plate in longitudinal directions of the vehicle;
the bumper fascia has an opposing plate that opposes the flange plate of the coupling member;
the flange plate has a mounted part to the opposing plate;
the mounted part is disposed above a location where the first portion of the coupling member is coupled to the shroud;
the impact absorbing member is provided with a reinforcement rib that couples the front plate and the upper plate; and
the lower end of the reinforcement rib is disposed so as to be separated from the lower plate by a given distance.

11. The front part structure of claim 1, wherein
the coupling member couples the shroud to the upper end portion of the bumper fascia;
the impact absorbing member intervenes between the upper end portion of the bumper fascia and the coupling member;
the coupling member includes:
a rear portion having a planar part extending in width directions of the vehicle and a coupled part coupled to the shroud, and
a front portion having a recessed portion that is located below the upper end portion of the bumper fascia, is dented lower than the planar part, and extends in width directions of the vehicle; and
the impact absorbing member is provided with the support part that is disposed on the recessed portion and supports the upper end portion of the bumper fascia, and the fixed part that is fixed to the coupling member.

12. The front part structure of claim 11, wherein the fixed part of the impact absorbing member to the coupling member is disposed above the planar part.

13. The front part structure of claim 12, wherein
the front portion of the coupling member is provided with a flange plate extending upwardly;
the impact absorbing member is provided with a front plate that opposes the flange plate; and
the front plate is provided with:
a lower part that is disposed so as to overlap with the flange plate in longitudinal directions of the vehicle, and forms the fixed part, and an upper part that does not overlap with the flange plate in longitudinal directions of the vehicle.

14. The front part structure of claim 13, wherein
the bumper fascia has an opposing plate that opposes the flange plate of the coupling member;
the flange plate has a mounted part that opposes the opposing plate; and
the mounted part is disposed at substantially a same height as the fixed part of the impact absorbing member.

15. The front part structure of claim 11, wherein
the impact absorbing member is provided with an upper plate, a front plate, and a lower plate, and has a 'C' shape that is opened rearward, when viewed in a cross sectional perspective thereof in longitudinal directions of the vehicle;
the support part is provided to the upper plate; and
the fixed part is provided to one of the front plate and the lower plate.

16. The front part structure of claim 12, wherein
the impact absorbing member is provided with an upper plate, a front plate, and a lower plate, and has a 'C' shape that is opened rearward, when viewed in a cross sectional perspective thereof in longitudinal directions of the vehicle;
the support part is provided to the upper plate; and
the fixed part is provided to one of the front plate and the lower plate.

17. The front part structure of claim 11, wherein the recessed portion is provided with:
a first recessed portion where the impact absorbing member is placed, and
a second recessed portion formed rearward of and integrally with the first recessed portion, and dented lower than the first recessed portion.

18. The front part structure of claim 11, wherein a second recessed portion functions as a drainage channel of water that enters from a gap between the upper end portion of the bumper fascia and the leading edge of the hood.

19. A front part structure of a vehicle, comprising:
a bumper fascia disposed at a front part of the vehicle and having an upper end portion opposing a leading edge of a hood;
a shroud disposed rearward from the bumper fascia, and configured to lead cooling air to a given device;
a coupling member that couples the shroud to the upper end portion of the bumper fascia; and
an impact absorbing member that intervenes between the upper end portion of the bumper fascia and the coupling member, wherein
the coupling member includes:
a rear portion having a planar part extending in width directions of the vehicle and a coupled part coupled to the shroud, and
a front portion having a recessed portion that is located below the upper end portion of the bumper fascia, is dented lower than the planar part, and extends in width directions of the vehicle,
the impact absorbing member is provided with a support part that is disposed on the recessed portion and supports the upper end portion of the bumper fascia, and a fixed part that is fixed to the coupling member;
the fixed part of the impact absorbing member to the coupling member is disposed above the planar part,
the front portion of the coupling member is provided with a flange plate extending upwardly;
the impact absorbing member is provided with a front plate that opposes the flange plate;
the front plate is provided with:
a lower part that is disposed so as to overlap with the flange plate in longitudinal directions of the vehicle, and forms the fixed part, and
an upper part that does not overlap with the flange plate in longitudinal directions of the vehicle;
the bumper fascia has an opposing plate that opposes the flange plate of the coupling member;
the flange plate has a mounted part that opposes the opposing plate;
the mounted part is disposed at substantially a same height as the fixed part of the impact absorbing member;
the impact absorbing member is provided with an upper plate, a front plate, and a lower plate, and has a 'C' shape that is opened rearward, when viewed in a cross sectional perspective thereof in longitudinal directions of the vehicle;
the support part is provided to the upper plate;
the fixed part is provided to one of the front plate and the lower plate;
the recessed portion is provided with:
a first recessed portion where the impact absorbing member is placed, and
a second recessed portion formed rearward of and integrally with the first recessed portion, and dented lower than the first recessed portion; and
the second recessed portion functions as a drainage channel of water that enters from a gap between the upper end portion of the bumper fascia and the leading edge of the hood.

* * * * *